US011951052B2

(12) United States Patent
Lucas et al.

(10) Patent No.: US 11,951,052 B2
(45) **Date of Patent: *Apr. 9, 2024**

(54) PATIENT TRANSFER APPARATUS WITH INTEGRATED TRACKS

(71) Applicant: Stryker Corporation, Kalamazoo, MI (US)

(72) Inventors: Ross Lucas, Paw Paw, MI (US); Chris Gentile, Sturgis, MI (US); Bjorn Gunderson, Chicago, IL (US); Daniel Brosnan, Kalamazoo, MI (US)

(73) Assignee: Stryker Corporation, Kalamazoo, MI (US)

( * ) Notice: Subject to any disclaimer, the term of this patent is extended or adjusted under 35 U.S.C. 154(b) by 886 days.

This patent is subject to a terminal disclaimer.

(21) Appl. No.: 16/934,170

(22) Filed: Jul. 21, 2020

(65) Prior Publication Data

US 2020/0345567 A1 Nov. 5, 2020

Related U.S. Application Data

(63) Continuation of application No. 15/854,943, filed on Dec. 27, 2017, now Pat. No. 10,758,437.

(Continued)

(51) Int. Cl.

| | |
|---|---|
| ***A61G 5/06*** | (2006.01) |
| ***A61G 5/04*** | (2013.01) |
| ***A61G 5/10*** | (2006.01) |

(52) U.S. Cl.

CPC ............... *A61G 5/061* (2013.01); *A61G 5/04* (2013.01); *A61G 5/066* (2013.01); *A61G 5/1051* (2016.11)

(58) Field of Classification Search

CPC .......... A61G 5/061; A61G 5/04; A61G 5/066; A61G 5/1051

(Continued)

(56) References Cited

U.S. PATENT DOCUMENTS

| | | | |
|---|---|---|---|
| 2,319,008 | A | 5/1943 | McCormack |
| 2,931,449 | A | 4/1960 | King |

(Continued)

FOREIGN PATENT DOCUMENTS

| | | | |
|---|---|---|---|
| CA | 2746194 | C | 10/2014 |
| CN | 204915772 | U | 12/2015 |

(Continued)

OTHER PUBLICATIONS

Addady, Michael, "This Wheelchair is Like a Segway Crossed with a Tank, and it Can Climb Stairs", Oct. 19, 2015, article and video downloaded from http://fortune.com/2015/10/19/wheelchair-climb-stairs/, 2 pages.

(Continued)

*Primary Examiner* — Minnah L Seoh
*Assistant Examiner* — Conan D Duda
(74) *Attorney, Agent, or Firm* — Howard & Howard Attorneys PLLC

(57) ABSTRACT

A patient transfer apparatus configured to traverse stairs includes a seat assembly, a rear leg pivotably coupled to the seat assembly, a track integrated with the rear leg, and a wheel coupled to a distal end portion of the rear leg. The seat assembly includes a frame with a seat portion. The rear leg is pivotable relative to the seat portion between a transport position and a stair traversing position. In the transport position the wheel is configured to contact a floor, and in the stair traversing position the track is configured to contact the stairs.

17 Claims, 15 Drawing Sheets

Related U.S. Application Data

(60) Provisional application No. 62/440,167, filed on Dec. 29, 2016.

(58) Field of Classification Search
USPC .......................................................... 180/9.3
See application file for complete search history.

(56) References Cited

U.S. PATENT DOCUMENTS

| | | | | |
|---|---|---|---|---|
| 3,111,331 | A | 11/1963 | Locke | |
| 3,127,188 | A | 3/1964 | Greub | |
| 3,146,841 | A | 9/1964 | Locke | |
| 3,191,953 | A | 6/1965 | Aysta | |
| 3,195,910 | A | 7/1965 | Steiner | |
| 3,198,534 | A | 8/1965 | Robinson | |
| 3,231,290 | A | 1/1966 | Weyer | |
| 3,276,531 | A | 10/1966 | Hale | |
| 3,529,688 | A | 9/1970 | Bruce | |
| 4,044,850 | A | 8/1977 | Winsor | |
| 4,136,888 | A | 1/1979 | Bowie, Jr. et al. | |
| 4,401,178 | A | 8/1983 | Studer | |
| 4,432,425 | A | 2/1984 | Nitzberg | |
| 4,556,229 | A | 12/1985 | Bihler et al. | |
| 4,566,706 | A | 1/1986 | Bihler et al. | |
| 4,566,707 | A | 1/1986 | Nitzberg | |
| 4,627,508 | A | 12/1986 | Auer | |
| 4,771,839 | A | 9/1988 | Misawa | |
| 4,962,941 | A | 10/1990 | Rembos | |
| 5,036,929 | A | 8/1991 | Trougouboff | |
| 5,158,309 | A | 10/1992 | Quigg | |
| 5,197,558 | A | 3/1993 | Misawa | |
| 5,335,741 | A | 8/1994 | Rabinovitz et al. | |
| 5,338,048 | A | 8/1994 | Medina | |
| 5,423,563 | A | 6/1995 | Wild | |
| 5,868,403 | A | 2/1999 | Culp et al. | |
| 6,341,784 | B1 | 1/2002 | Carstens | |
| 6,484,829 | B1 | 11/2002 | Cox | |
| 6,644,426 | B1 * | 11/2003 | Larue | A61G 5/066 180/9.1 |
| 6,648,343 | B2 | 11/2003 | Way et al. | |
| 8,061,460 | B2 | 11/2011 | Scheck | |
| 8,307,473 | B1 * | 11/2012 | Lambarth | A61G 5/061 5/81.1 R |
| 8,371,403 | B2 | 2/2013 | Underwood | |
| 8,640,798 | B2 | 2/2014 | Walkingshaw et al. | |
| 9,004,204 | B2 | 4/2015 | Walkingshaw et al. | |
| 9,486,373 | B2 | 11/2016 | Lambarth et al. | |
| 9,510,981 | B2 | 12/2016 | Lambarth et al. | |
| 10,758,437 | B2 | 9/2020 | Lucas | |
| 2003/0132585 | A1 | 7/2003 | Way et al. | |
| 2003/0141677 | A1 | 7/2003 | Medina | |
| 2003/0183428 | A1 | 10/2003 | Hedeen | |
| 2004/0160103 | A1 * | 8/2004 | Aono | A61G 5/125 297/330 |
| 2006/0037789 | A1 | 2/2006 | Kritman et al. | |
| 2006/0038360 | A1 | 2/2006 | Negishi | |
| 2006/0076739 | A1 | 4/2006 | Kikusato | |
| 2006/0124366 | A1 | 6/2006 | Le Masne De Chermont | |
| 2007/0095581 | A1 | 5/2007 | Chambliss et al. | |
| 2008/0067762 | A1 | 3/2008 | Rembos et al. | |
| 2009/0230638 | A1 | 9/2009 | Reed et al. | |
| 2010/0117312 | A1 | 5/2010 | Walkingshaw et al. | |
| 2011/0175302 | A1 | 7/2011 | Sherman et al. | |
| 2012/0139197 | A1 | 6/2012 | Livingston | |
| 2013/0026737 | A1 | 1/2013 | Pizzi Spadoni | |
| 2013/0081885 | A1 | 4/2013 | Connor | |
| 2013/0175770 | A1 | 7/2013 | Morrish et al. | |
| 2013/0274973 | A1 | 10/2013 | Kamara et al. | |
| 2014/0021006 | A1 | 1/2014 | Kamara et al. | |
| 2014/0084553 | A1 | 3/2014 | Carletti | |
| 2014/0299391 | A1 | 10/2014 | Carletti | |
| 2015/0251713 | A1 | 9/2015 | Couture et al. | |
| 2016/0176453 | A1 | 6/2016 | Rudakevych | |
| 2017/0035628 | A1 | 2/2017 | Naber et al. | |
| 2017/0079859 | A1 | 3/2017 | Lambarth et al. | |
| 2018/0021191 | A1 | 1/2018 | Lambarth et al. | |
| 2018/0028377 | A1 | 2/2018 | Stryker et al. | |
| 2018/0028383 | A1 | 2/2018 | Stryker et al. | |
| 2018/0177652 | A1 | 6/2018 | Furman et al. | |
| 2018/0185212 | A1 | 7/2018 | Lucas et al. | |
| 2018/0185213 | A1 | 7/2018 | Naber et al. | |
| 2019/0209404 | A1 | 7/2019 | Kuhnl-Kinel | |
| 2019/0307261 | A1 | 10/2019 | Gervais | |

FOREIGN PATENT DOCUMENTS

| | | | |
|---|---|---|---|
| GB | 2429192 | A | 2/2007 |
| JP | 5878877 | B2 | 3/2016 |
| WO | 2008127944 | A1 | 10/2008 |

OTHER PUBLICATIONS amazon.com, "LINE2 Design Battery Powered Track Stair Chair 70019-Y-BAT Heavy Duty Emergency Lightweight Portable Folding Evacuation Chair", 2019, https://www.amazon.com/LINE2design-70019-Y-BAT-Emergency-Lightweight-Evacuation/dp/B07MDHF4CP, 8 pages.
Bouckley, Hanna, "The Wheelchair That Can Travel Up Stairs", 2016, downloaded from http://home.bt.com/tech-gadgets/tech-news/the-wheelchair-that-can-travel-up-stairs-11364035427656, 2 pages.
English language abstract and machine-assisted English translation for CN 204915772 extracted from espacenet.com database on Jun. 6, 2018, 14 pages.
English language abstract for JP 5878877 extracted from espacenet.com database on Jun. 6, 2018, 2 pages.
Gomes, Carlos, "Using LabVIEW and MyRIO, We Created a Wheelchair That Can Improve the Lives of Disabled People and Give Them the Mobility Everyone Deserves", 2016, Case Study and Video downloaded from http://sine.ni.com/cs/app/doc/p/id/cs-16829, 2 pages.
Mobile Stairlift, "Mobile Stairlift & Accessories Webpage", 2019, https://www.mobilestairlift.com/products/mobile-stairlift-battery-powered-portable, 4 pages.
Mobile Stairlift, "Mobile Stairlift Motorized Chair Lift—Battery Powered Webpage", 2019, https://www.mobilestairlift.com/collections/mobile-stairlift-accessories, 5 pages.
Promeba, S.L., "Promeba Emergency & Rescue—Chair PS-250/Power Track PA-260/Support PA-270 Catalog", http://promeba.com/wp-content/uploads/2017/05/Cataleg_Promeba_PS-250_v01_BR.pdf, Jan. 2017, 16 pages.
The Gadget Flow, "SCEWO Stair Climbing Wheelchair", 2017, downloaded from https://thegadgetflow.com/portfolio/scewo-stair-climbing-wheelchair/, 3 pages.
Topchair France, "Photo of Stair-Climbing Wheelchair" 2015, downloaded from http://www.topchair.fr/wp-content/uploads/2015/07/Topchair-S-fauteuil-electrique-escalier-e1453809380620.jpg, 1 page.
Topchair, "Topchair-S Stair-Climbing Wheelchair User Guide", May 2014, 54 pages.
Youtube, "How to Use the Mobile Stairlift Dolly—An Introductory Guide Video", Apr. 10, 2018, https://www.youtube.com/watch?v=BQt3-q73Zyg, 2 pages.
Youtube, "Introducing the Mobile Stairlift—Portable Stair Climbing Wheelchair Video", Apr. 10, 2018, https://www.youtube.com/watch?v=QhBhuuoeyd4, 3 pages.
Youtube, "ST003A Plus New Type Mobility Stair Climber Chair for Lifting Elderly Video", Apr. 5, 2018, https://www.youtube.com/watch?v=_ ItZ1Nbpf-0, 2 pages.

* cited by examiner

PATIENT TRANSFER APPARATUS WITH INTEGRATED TRACKS

CROSS-REFERENCE TO RELATED APPLICATIONS

This application is a continuation of U.S. patent application Ser. No. 15/854,943 filed on Dec. 27, 2017, which claims the benefit of and priority to U.S. Provisional Patent Application No. 62/440,167 filed on Dec. 29, 2016, the entire contents and disclosures of each of which are hereby incorporated by reference in their entirety.

BACKGROUND

Patient transfer apparatuses (e.g., stair chairs, stretchers, wheelchairs, etc.) may be adapted to transport patients up or down an incline, such as stairs. In many instances, it may be difficult for individuals to travel up or down stairs on their own. In situations where stairs are the only viable option to navigate between floors, such as outdoor staircases without ramps or buildings without elevators, patient transfer apparatuses may be employed. These allow one or more operators to move a patient up or down stairs in a safe and controlled manner.

Patient transfer apparatuses may make use of a track that contacts the stairs, supporting at least a portion of the weight of the patient and allowing the patient transfer apparatus to transition between stairs. This track may be deployed by moving it backwards, away from the apparatus. In the deployed position, the track may occupy a significant amount of space, which may present challenges in moving the apparatus through confined spaces.

DETAILED DESCRIPTION

A patient transfer apparatus is configured to be controlled by an operator to traverse a set of stairs while supporting a patient. According to various exemplary embodiments, the patient transfer apparatus includes a seat assembly and one or more legs coupled to the seat assembly. The seat assembly is configured to support a patient. A track is integrated into at least one of the legs and is configured to move the patient transfer apparatus when it comes into contact with a set of stairs. A wheel is coupled to a distal end portion of each of the legs. When supporting the patient on level ground or a substantially smooth incline, the apparatus is configured such that the wheels touch the ground. The apparatus is further configured such that the rear legs pivot relative to the seat assembly to bring the integrated track into contact with a number of stairs while still maintaining the orientation (e.g., a horizontal orientation) of the seat assembly relative to the ground. Integration of the tracks into the legs is intended to result in a significant space savings. Further, the design presented in various embodiments described herein results in patient placement directly above the tracks, which results in a lesser degree of apparatus incline during stair transport. In this way, the seat assembly and the patient maintain a more level position during stair transport.

Figure 1:
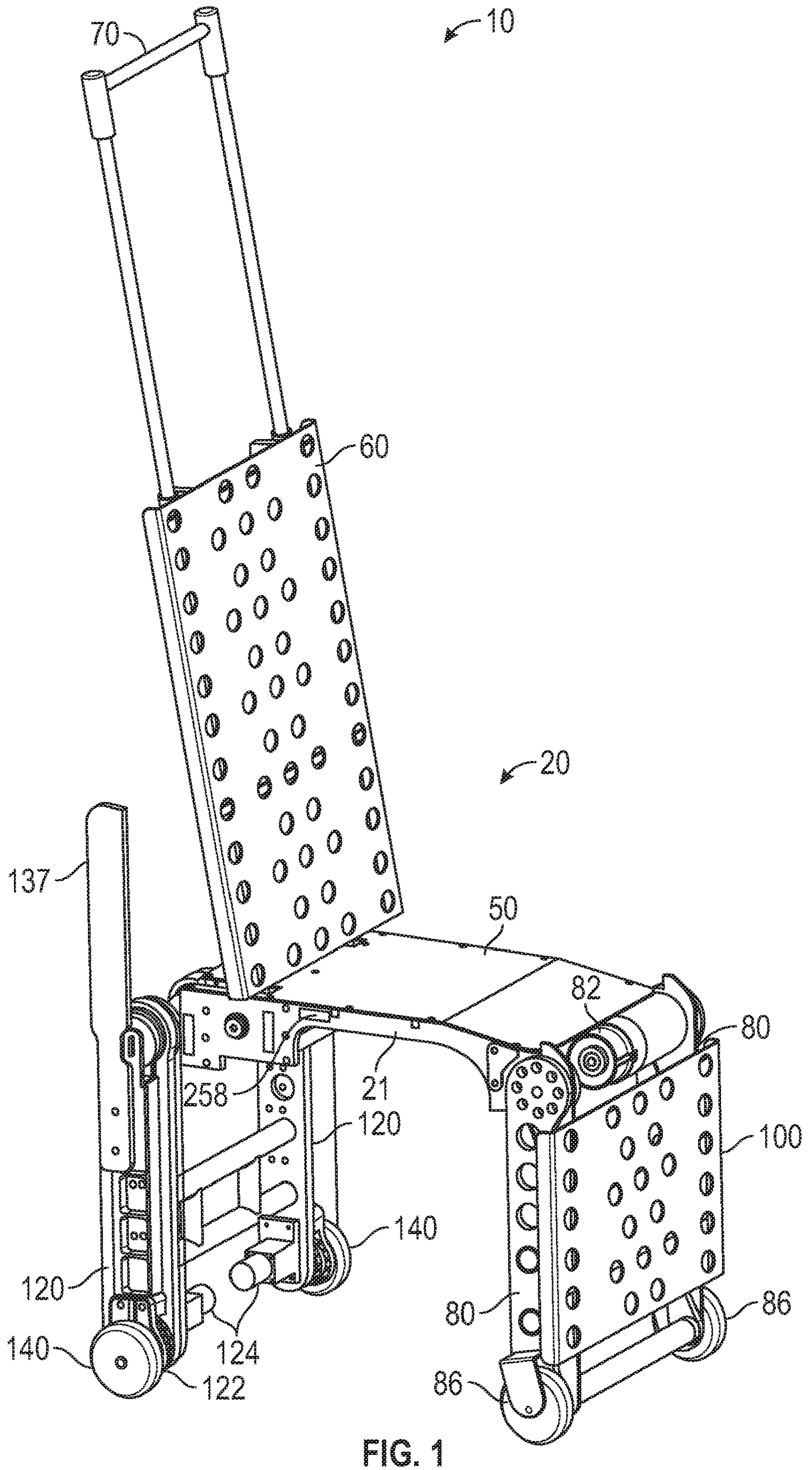
FIG. 1 is a perspective view of a patient transfer apparatus, according to an exemplary embodiment.

Referring to FIG. 1, an exemplary embodiment of a patient transfer apparatus is shown as patient transfer apparatus 10. In the illustrated embodiment, patient transfer apparatus 10 includes a seat assembly 20 including a frame 21 and configured to support a patient, two front legs 80 coupled to the seat assembly 20, a foot rest 100 pivotably coupled to the seat assembly 20, two rear legs 120 pivotably coupled to the seat assembly 20, and a track 122 (FIGS. 2A-2B) translatably coupled to each of the rear legs 120. In some embodiments, the patient transfer apparatus 10 further includes a control system 200 (depicted in FIG. 10) having a power source 205, a controller 210, one or more sensors, and one or more selectors. The patient transfer apparatus 10 may further include an operator interface 280 (depicted in FIG. 11) for receiving user inputs at the selectors. According to the exemplary embodiment shown in the Figures, the patient transfer apparatus 10 includes a motor 124 coupled to each of the rear legs 120 to drive the tracks 122 and seat back motor 42 (FIG. 2A), front leg motor 82, and rear leg motor 126 configured to move various parts of the patient transfer apparatus 10 relative to the seat assembly 20. In other embodiments, there be may one or more of each of these motors, or one or more of these motors may be omitted entirely.

Figure 2A:
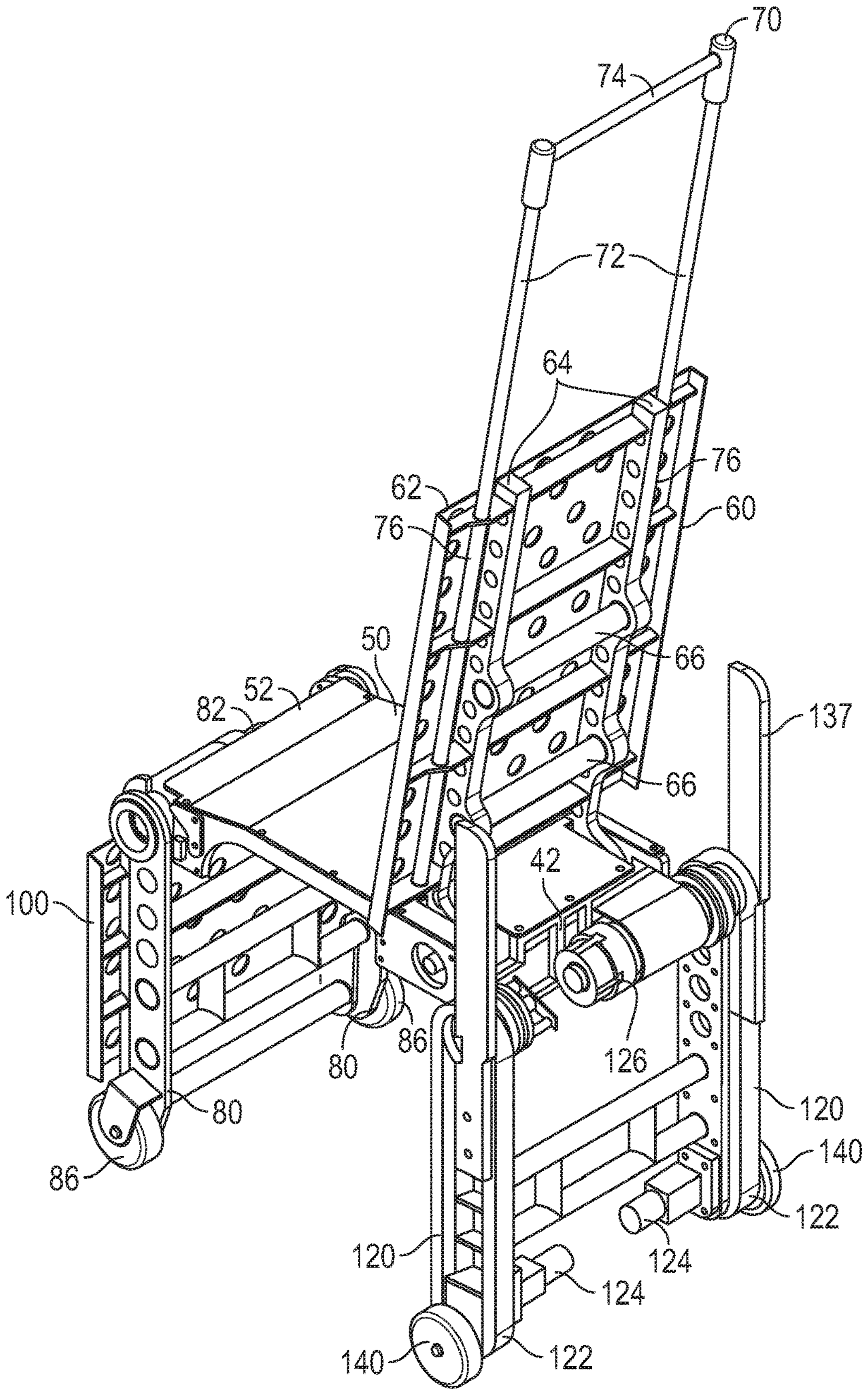
FIG. 2A is a rear perspective view of the patient transfer apparatus of FIG. 1 in a first configuration.
Figure 2B:
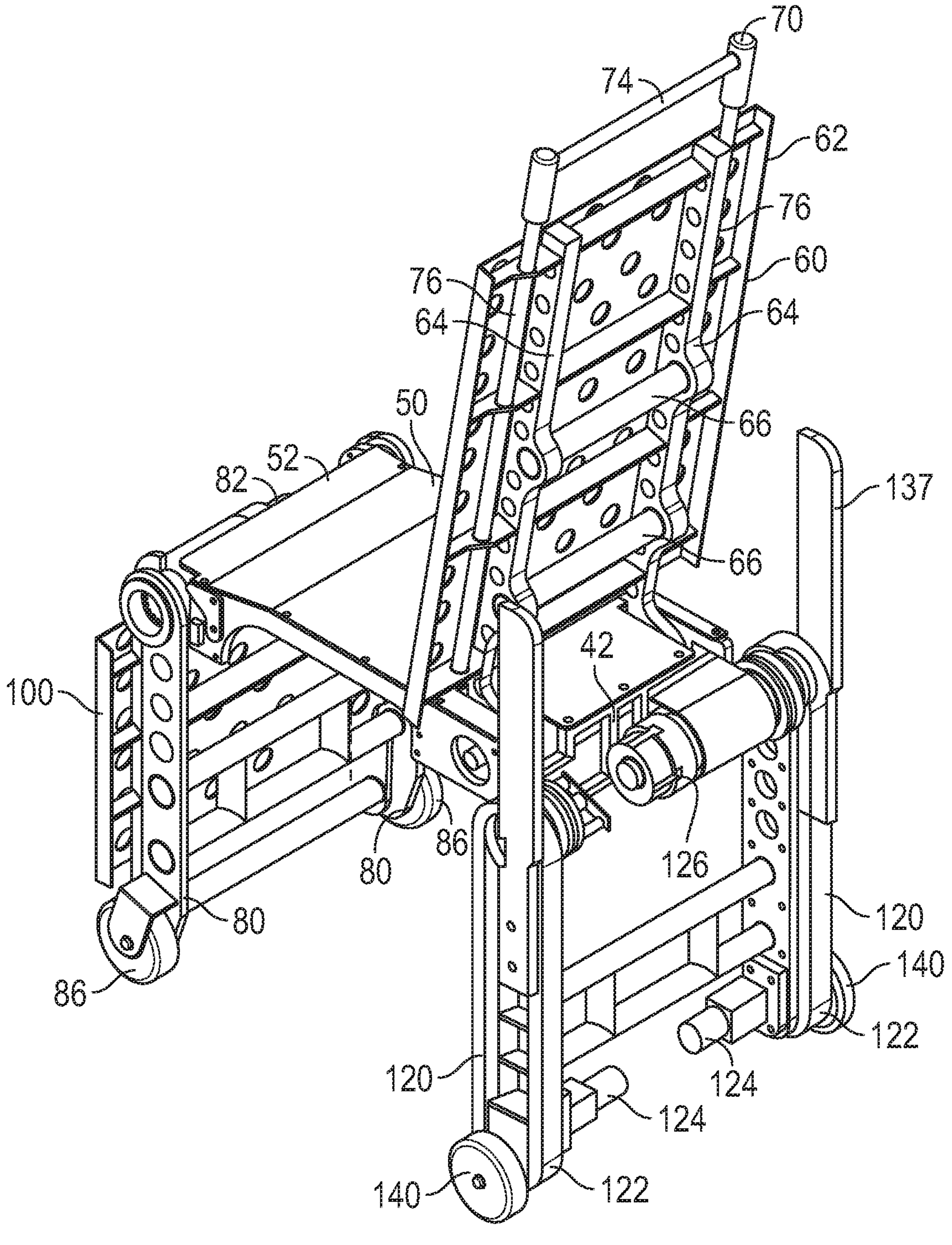
FIG. 2B is a rear perspective view of the patient transfer apparatus of FIG. 1 in a second configuration.
Figure 3:
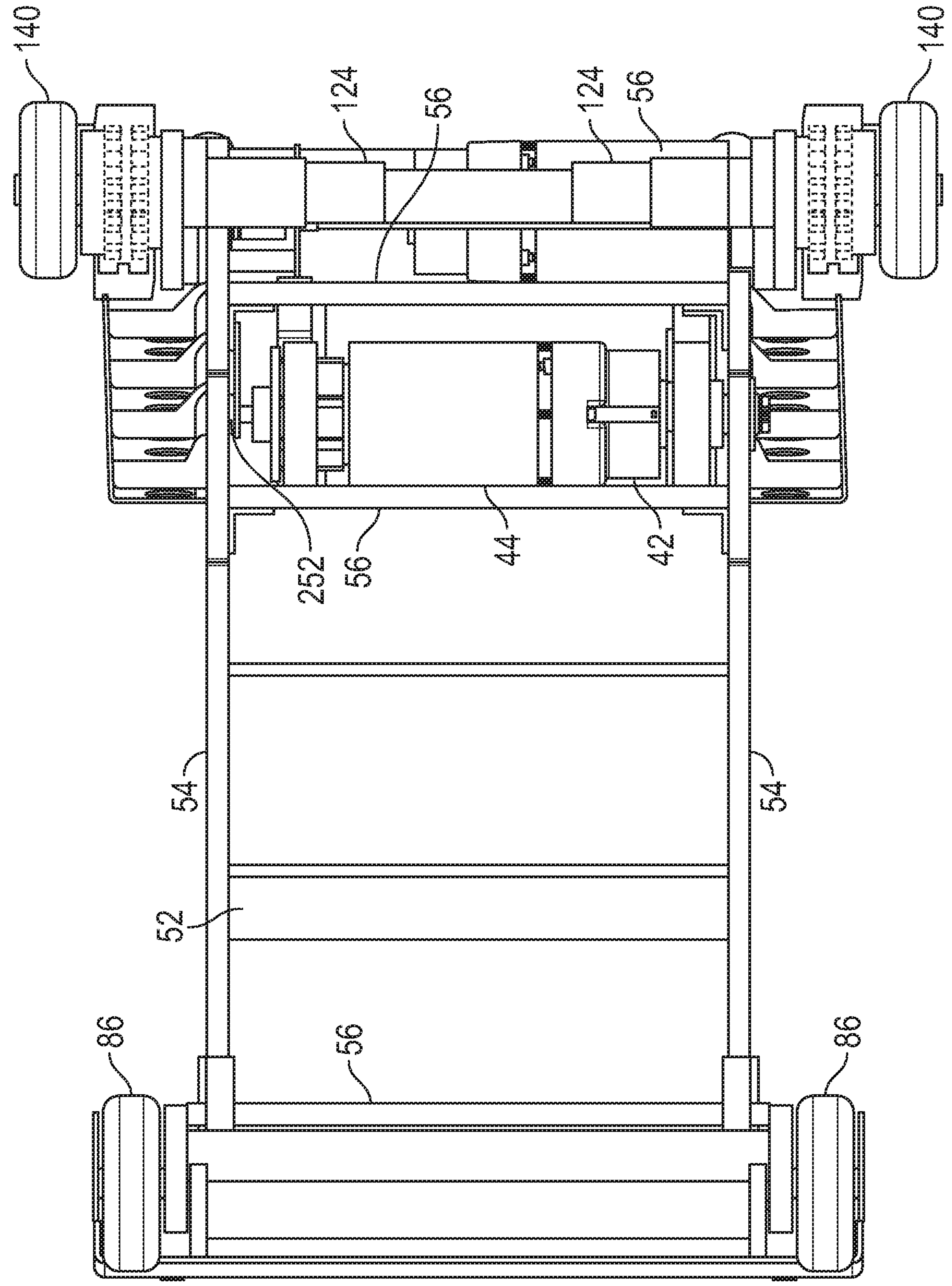
FIG. 3 is a bottom view of the patient transfer apparatus of FIG. 1.

Referring to FIGS. 2A-2B, the frame 21 includes a seat portion 50 and a back portion 60. The seat portion 50 supports the bottom of the patient, and thus, in some cases, supports most of the weight of the patient. The seat portion 50 includes a seat 52 that, as shown, is a sheet of bent material. In other embodiments, the seat 52 is made from various materials (e.g., molded plastic, fabric, foam covered in plastic, etc.) with one or more pieces that provide various benefits (e.g., support, cost, comfort, etc.). Referring to FIG. 3 of the illustrated embodiment, the seat portion 50 includes side members 54 and horizontal members 56. The horizontal members 56 may be coupled to the side members 54, and the seat 52 may be coupled to the side members 54. In some embodiments, the seat 52 can be removed to facilitate cleaning. In other embodiments, the structure of the seat portion 50 varies from the exemplary embodiment shown in FIGS. 2A-2B. By way of example, various materials may be used (e.g., aluminum, plastic, steel, etc.), various material cross sections may be used (square tubes, round tubes, solid, etc.), a different number of components may be used, and the components may be arranged differently (e.g., the seat 52 is coupled to the horizontal members 56 instead of the side members 54).

Referring back to FIG. 2A of the illustrated embodiment, back portion 60 of the frame 21 includes back 62 which supports the back of the patient. Back 62 is shown as a sheet of bent material. In other embodiments, the back 62 is made from one or more pieces of other materials (e.g., molded plastic, fabric, foam covered in plastic, etc.) that provide various benefits (e.g., support, cost, comfort, etc.). The back portion 60 may include vertical members 64 and horizontal members 66. In this exemplary embodiment, the horizontal members 66 are tubes that enter into apertures in the vertical members 64 and are coupled therein. In the illustrated embodiment, the back 62 is coupled (e.g., fastened, adhered, welded, etc.) to the vertical members 64. In other embodiments, the structure of the back portion 60 varies from the exemplary embodiment shown in FIG. 2A. By way of example, various materials may be used (e.g., aluminum, plastic, steel, etc.), various material cross sections may be used (square tubes, round tubes, solid, etc.), a different number of components may be used, and the components may be arranged differently (e.g., the back 62 is coupled to the horizontal members 66 instead of the vertical members 64).

Referring still to the exemplary embodiment shown in FIGS. 2A and 2B, the back portion 60 includes a handle 70. In some embodiments, the handle 70 includes two vertical members 72 coupled to a horizontal member 74. The vertical members 72 may be slidably coupled to telescoping members 76, which may be coupled to the vertical members 64. In some embodiments, the handle 70 includes a means of selectively fixing the handle in an extended configuration, shown in FIG. 2A, and a stored configuration, shown in FIG. 2B. The extended configuration allows the operator to manipulate (e.g., push, pull, turn, etc.) the patient transfer apparatus 10 without having to bend over. The stored configuration allows the handle to take up a minimal amount of space, facilitating storage of the patient transfer apparatus 10 in a confined space. In other embodiments, the handle 70 is fixed relative to the back portion 60. In some embodiments, other handles are added to the patient transfer apparatus 10 to facilitate controllability or carrying of the patient transfer apparatus 10.

Figure 4:
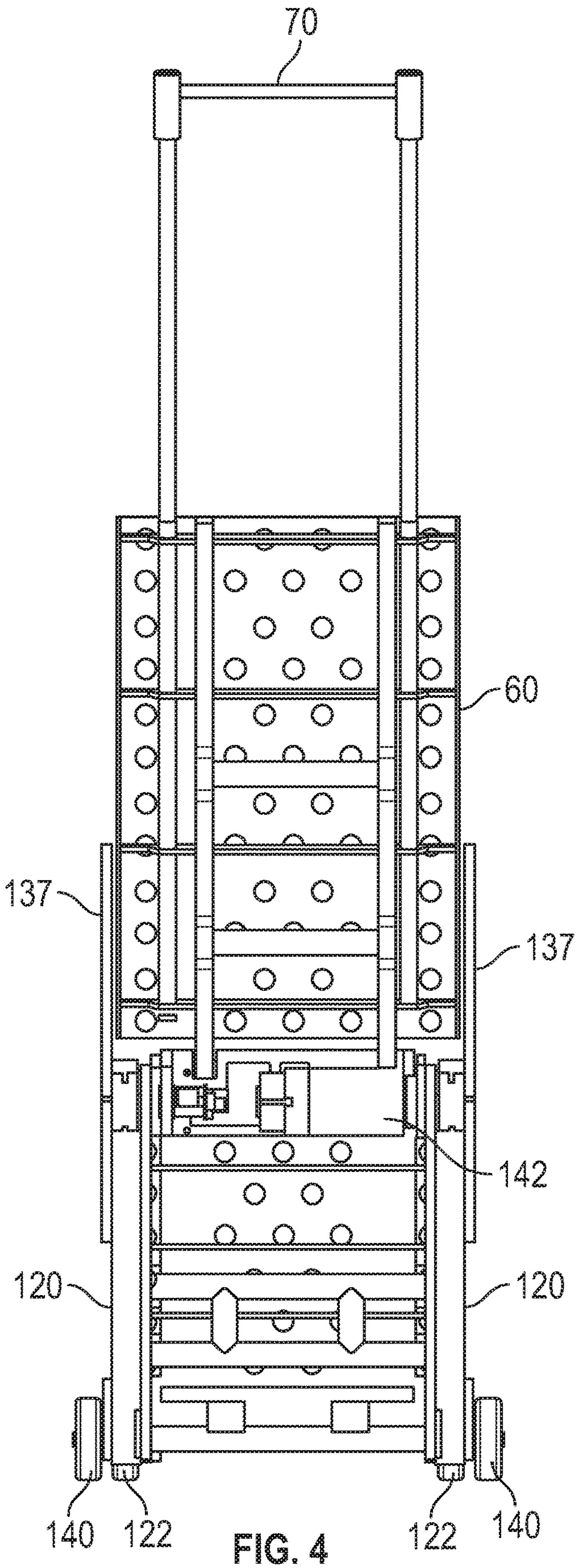
FIG. 4 is a rear view of the patient transfer apparatus of FIG. 1.
Figure 5:
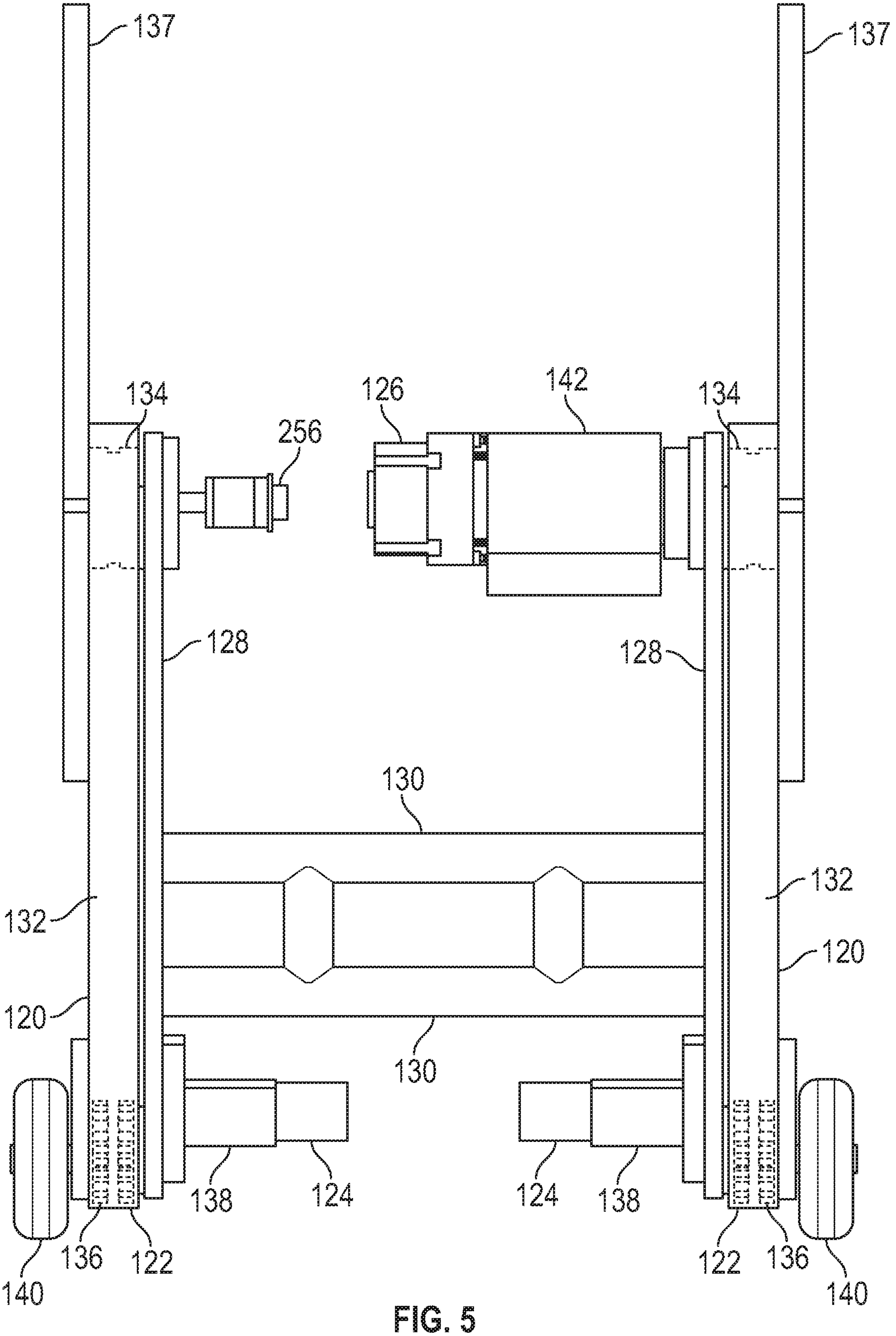
FIG. 5 is an enlarged rear view of rear legs of the patient transfer apparatus of FIG. 1, according to an exemplary embodiment.

Referring to the exemplary embodiment shown in FIG. 4, the patient transfer apparatus 10 includes two rear legs 120 pivotably coupled to the seat assembly 20. FIG. 5 shows a close up view of the rear legs 120. In the illustrated embodiment, each rear leg 120 (which may be a rear leg assembly) includes a vertical rear leg member 128. Two horizontal rear leg members 130 are coupled to both vertical rear leg members 128, such that both vertical rear leg members 128 pivot in unison relative to the seat assembly 20. The horizontal rear leg members 130 are shown as round tubes that are coupled inside of apertures in the vertical rear leg members 128. Horizontal rear leg members 130 additionally provide structural rigidity to the vertical rear leg members 128. In other embodiments, the vertical rear leg members 128 are coupled in a different manner (e.g., using one horizontal member, using a number of small members and a sheet of material, etc.). In other embodiments, the rear legs 120 have a different structure (e.g., the vertical rear leg members 128 are made of tube, the front legs are one piece of bent sheet metal, etc.). In some embodiments, there may be one or more rear legs 120.

Referring again to the exemplary embodiment shown in FIG. 5, each rear leg 120 also includes the track 122 integrated into each rear leg 120, as described below. In the illustrated embodiment, track 122 runs parallel with the vertical rear leg member 128. Track 122 acts as a tractive element between the patient transfer apparatus 10 and the set of stairs when traversing a set of stairs, as will be explained in further detail below. In the illustrated embodiment, track 122 rides along track support member 132, which is rigidly coupled to the vertical rear leg member 128. In the illustrated embodiment, rotatably coupled to both the vertical rear leg member 128 and the track support member 132 are idler pulley 134 and driven pulley 136. The pulleys 134, 136 are coupled to the respective vertical rear leg member 128 for supporting movement of the track 122 relative to the frame. The track 122 may ride on the idler pulley 134 and the driven pulley 136, and increasing the distance between the idler pulley 134 and the driven pulley 136 increases the tension on the track 122. In some embodiments, the spacing between the pulleys 134 and 136 is adjustable. In some embodiments, the track 122 and one or both of the pulleys 134 and 136 include a means of preventing slippage between the pulleys 134 and 136 and the track 122 (e.g., a timing belt pattern). In the illustrated embodiment, the rear leg 120 may include a slide 137 coupled to each track support member 132. In some embodiments, the slide 137 is configured to have at least one side made of a piece of material chosen to minimize friction between the slide 137 and the set of stairs. In other embodiments, the slide 137 is otherwise configured to reduce friction (e.g., by including a series of wheels where the slide 137 contacts the set of stairs). In some embodiments, the slide 137 is an extension of the vertical rear leg member 128 or the track support member 132.

In the illustrated embodiment, the driven pulley 136 is driven by motor 124 through gearbox 138. Gearbox 138 and driven pulley 136 indirectly couple the motor 124 to the track 122. In the illustrated embodiment, the motor 124 is coupled to the gearbox 138 and the gearbox 138 is coupled to the vertical rear leg member 128. In some embodiments, the gearbox 138 drives the driven pulley directly (i.e., with no reduction in speed between the output of the gearbox 138 and the driven pulley 136). In other embodiments, an intermediate reduction is used. By way of example, the driven pulley 136 includes a gear tooth pattern on an interior surface that corresponds to the output of the gearbox 138. This provides an additional reduction, lessening the size of the gearbox 138, and offsets the motor 124 farther from the ground to avoid obstacles. In other embodiments, motor 124 is located inside the pulley 136.

In some embodiments, the motor 124 and gearbox 138 are omitted, and the tracks 122 are not powered, but rather are passive tracks that move with movement of the patient transfer apparatus. In such embodiments, rear leg 120 may include a means of mechanically damping the movement of the track 122. By way of example, there may be a rotary damper incorporated into one of the pulleys 134 and 136 that dampens the rotation of the pulleys 134 and 136, which in turn dampens the movement of the track 122 (i.e., limits the speed of the track 122). By way of another example, the rear leg 120 may include a high friction pad that contacts the track 122, slowing its movement. This additional passive friction allows the patient transfer apparatus 10 to move down a set of stairs controllably without having to incorporate an active system (e.g., a number of motors, a controller, and a power source).

Referring again to FIG. 5, rear legs 120 include a wheel 140 rotatably coupled to the distal end portion of track support member 132. In other embodiments, the wheel 140 is coupled to the vertical rear leg member 128 instead. The wheel 140 and at least one pulley may be coaxial with one another, and the wheel 140 may be laterally offset from the respective pulley. As shown, the wheel 140 is a fixed wheel that rotates about only one axis. This allows the patient transfer apparatus 10 to be rocked back onto the wheels 140 in a "dollying" configuration where the wheels 86 on the front legs 80 are lifted above a small step or curb. After moving the wheels 86 above the curb, the operator can then lift the rear wheels 140 onto the curb. In other embodiments, the wheel 140 is capable of rotating relative to the vertical rear leg member 128 in two axes (i.e., in a caster style arrangement) to allow the patient transfer apparatus 10 to be turned about its front end if the wheels 86 on the front legs 80 are fixed wheels or to freely translate in any direction if the wheels 86 are also caster style wheels. In some embodiments, the wheels 140 are configured to be moved from a deployed position at the distal portion of the rear legs 120 when the rear legs 120 are in the transport position to a stowed position when the rear leg is in the stair traversing position. In the deployed position, shown in FIG. 1, the wheels 140 contact the support surface (i.e., the floor, which includes, for example, a landing adjacent the stairs). In the stored position, the wheels 140 retract to avoid contact with the stairs and/or to permit the track 122 to engage the stairs. The wheels 140 may be moved manually by the operator, or the apparatus 10 may include an actuator to move the wheels 140.

According to the exemplary embodiment shown in FIGS. 4 and 5, the rear legs 120 are pivotably coupled to the seat assembly 20, and the rear leg motor 126 is used to pivot the rear legs 120 relative to seat assembly 20. Pivoting the rear legs 120 brings the track 122 of each rear leg 120 into a position to contact the stairs, as will be explained in further detail below. In some embodiments, each rear leg 120 is pivotable relative to the seat portion between a transport position and a stair traversing position, wherein in the transport position the wheel 140 is configured to contact a support surface (i.e., the floor) and in the stair traversing position the track 122 is configured to contact the support surface (i.e., the stairs). In the illustrated embodiment, the rear leg motor 126 is coupled to gearbox 142 and provides power to the gearbox 142. The gearbox 142 may be coupled to the rear horizontal member 56. The output of gearbox 142 may be coupled to one of the rear vertical leg members 128 such that the gearbox 142 is configured to drive movement of the rear legs 120 relative to the seat portion 50. In the illustrated embodiment, the vertical rear leg member 128 coupled to the gearbox 142 is supported by the rear horizontal member 56, and the other vertical rear leg member 128 is pivotably coupled to the side member 54 nearest to the rear leg motor 126 (e.g., by including a bearing in the side member 54 and a stud protruding from the rear leg 120 into the bearing). This configuration structurally connects the rear legs 120 to the seat assembly 20 while still allowing relative movement between them. In some embodiments, the gearbox 142 prevents movement of the rear legs 120 relative to the seat assembly 20 (e.g., by using a gearbox that requires a large amount of force to be back-driven like a worm gear drive or a cycloidal drive) unless the rear leg motor 126 is driven. In other embodiments, the rear legs 120 can be selectively moveable (e.g., by using a clutch to decouple the rear legs 120 from the gearbox 142). In other embodiments, the motor and gearbox are omitted entirely, and the rear legs 120 can be selectively moveable manually (e.g., by manually turning a crank, by using a brake, etc.). In yet other embodiments, the rear legs 120 are fixed relative to the seat assembly 20.

Figure 6:
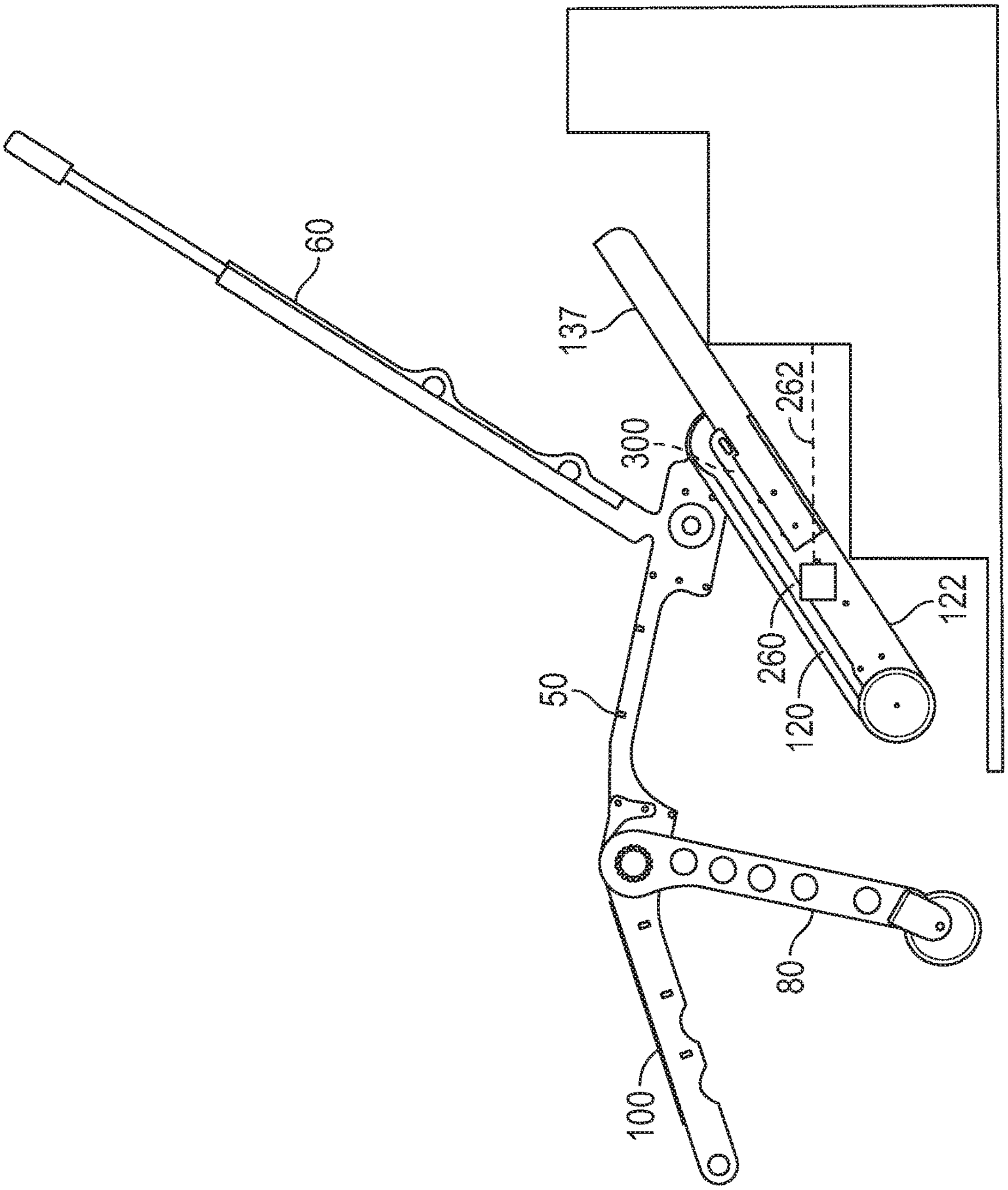
FIG. 6 is a side view of the patient transfer apparatus of FIG. 1 on a set of stairs.
Figure 7:
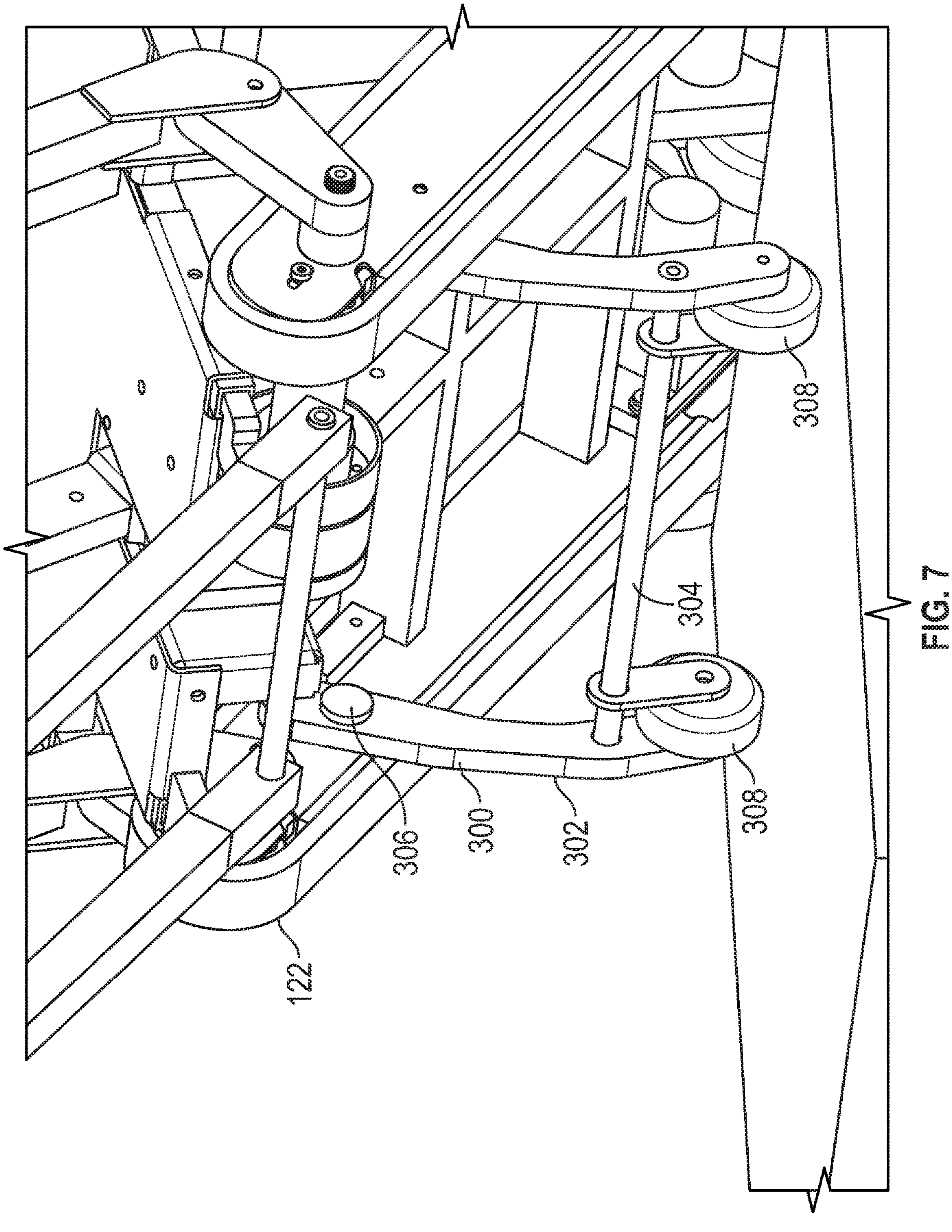
FIG. 7 is an enlarged perspective view of a support member of a patient transfer apparatus, according to an exemplary embodiment.

In some embodiments, the patient transfer apparatus 10 also includes support member 300. In the illustrated embodiment, support member 300 is pivotably coupled to the rear legs 120 such that the support member 300 can be moved from a stored position, where the support member 300 does not contact the stairs, floor, or other support surface (e.g., see FIG. 6), to a deployed position, shown in FIGS. 7 and 8, where the support member 300 contacts and supports the patient transfer apparatus 10 on the support surface (e.g., the floor, or a staircase landing if adjacent the stairs). Referring to FIG. 7 of the illustrated embodiment, the support member 300 includes structural members 302 coupled to cross member 304 and pivotable about joint 306. In some embodiments, a wheel 308 is rotatably coupled to the distal end portion of each of the structural members 302 such that the wheel 308 is able to contact the support surface (e.g., floor) in the deployed position. In some embodiments, the wheels 308 and the wheels 140 are arranged so that both sets of wheels 308 and 140 are able to contact the support surface simultaneously. This allows the patient transfer apparatus 10 to be moved freely across a level surface. As will be explained in further detail below, the support member 300 may aid in supporting the weight of the patient at the top of a set of stairs, reducing the load on the operator.

In some embodiments, the patient transfer apparatus 10 includes a support member motor configured to move or pivot the support member 300 between the stored position and the deployed position and a power source coupled to the support member motor (not illustrated). In some embodiments, the power source is power source 205. In other embodiments, the support member 300 is moved manually (e.g., using a hand crank, by pulling directly on the support member 300, by pulling on a cable connected to the support member 300, etc.). In some embodiments, the support member 300 is biased in the deployed direction (i.e., the direction of the deployed position) by a biasing force (e.g., a spring). By way of example, a torsion spring biases the support member 300 in the deployed direction and a latch mechanism holds the support member in the stored position. In other embodiments, a different mechanism is used to hold the support member 300 in the stored position (e.g., a pin, a brake, etc.). The support member 300 is then released (e.g., the latch mechanism is actuated using a solenoid, the operator actuates the latch mechanism using a cable, the latch mechanism includes an extension that releases the support member 300 when it contacts the stairs, etc.), allowing the biasing force to move the support member 300 into the deployed position. To return the support member 300 to the stored position, the support member motor may move the support member 300, the operator may then manually push the support member 300 back into position, or the support member 300 may be pushed when contacting the stairs. In some embodiments, a sensor, such as sensor 260, is configured to detect proximity to a staircase landing, and the controller 210 is configured to command movement of the support member 300 to the deployed position based on the proximity to the staircase landing.

Figure 9:
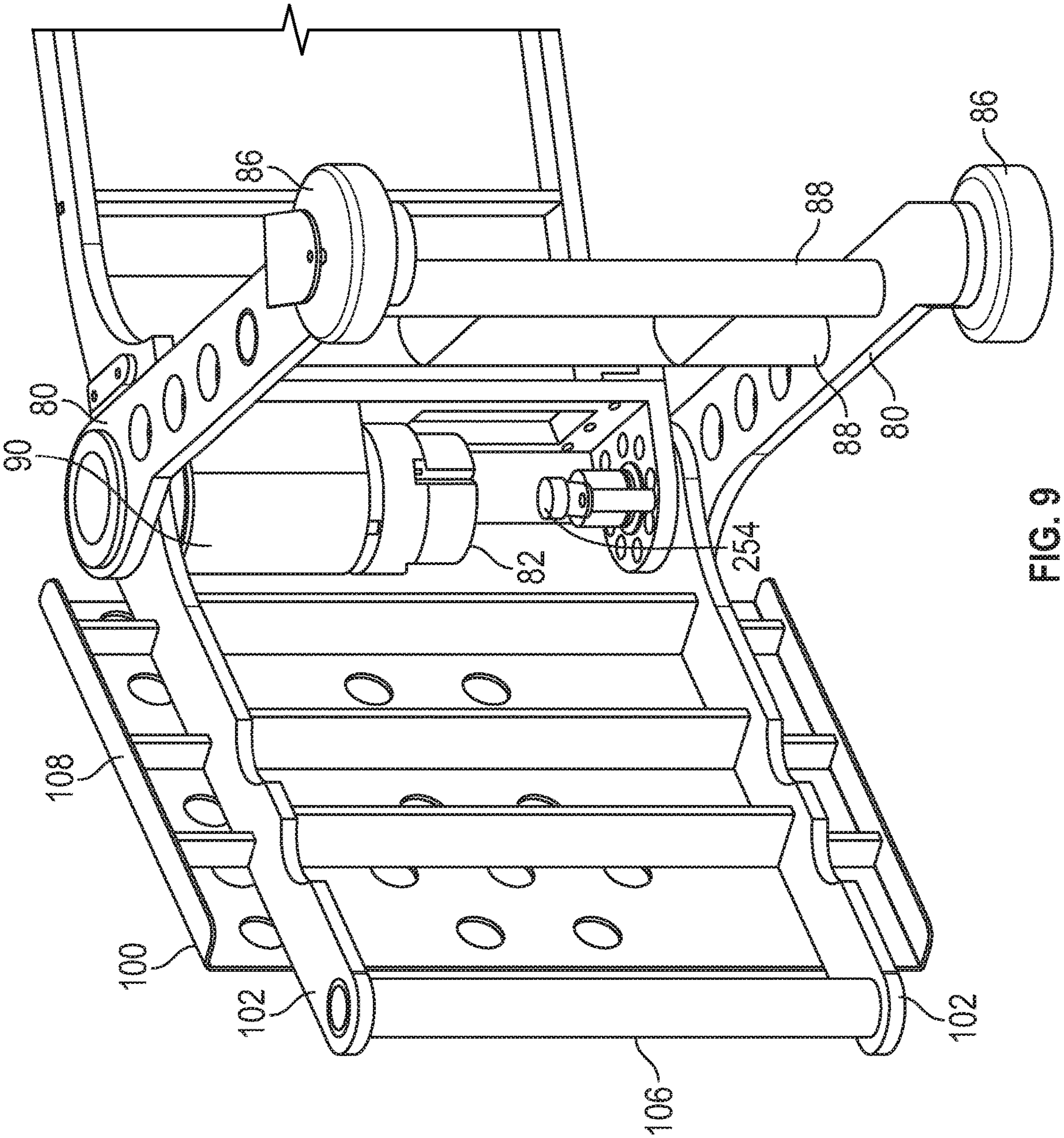
FIG. 9 is an enlarged bottom perspective view of a foot rest of the patient transfer apparatus of FIG. 1, according to an exemplary embodiment.

Referring to the exemplary embodiment shown in FIG. 9, front legs 80 are pivotably coupled to the seat assembly 20 and support the front end of the seat assembly 20 in some configurations. In the illustrated embodiment, a wheel 86 is rotatably coupled to the distal end portion of each front leg 80. As shown, the wheel 86 rotates on only one axis. In other embodiments, the wheel 86 is capable of rotating relative to the front leg 80 around two axes (i.e., in a caster style arrangement) to allow the patient transfer apparatus 10 to be turned about its rear end. In some embodiments, the wheels 86 are configured specifically to minimize the friction between the wheels 86 and the ground in the side-to-side direction to facilitate turning. In yet other embodiments, the wheels 86 are omitted and replaced with a fixed part that slides on the ground. One or more horizontal members 88 may be coupled between front legs 80 and cause both front legs 80 to pivot relative to the seat portion 50 in unison. The horizontal members 88 are shown as round tubes that are coupled inside of apertures in the front legs 80. Horizontal members 88 additionally provide structural rigidity to the front legs 80. In other embodiments, the front legs 80 are coupled in a different manner (e.g., using one large horizontal member, using a number of small members and a large sheet of material, etc.). In other embodiments, the front legs have a different structure (e.g., the front legs 80 are made of tube, the front legs are one piece of bent sheet metal, etc.). In some embodiments, there may be one or more front legs 80.

FIG. 9 shows an underside view of the front portion of the apparatus 10 in a first configuration. As shown, the front legs 80 are pivotably coupled to the seat assembly 20, and the front leg motor 82 is used to pivot the front legs 80 relative to the seat portion 50. It may be desirable to pivot the front legs 80 to prevent them from contacting the stairs when traversing the set of stairs, as will be explained in further detail below. In the illustrated embodiment, the front leg motor 82 is coupled to gearbox 90 and provides power to the gearbox 90. The gearbox 90 may be coupled to the horizontal member 56 located nearest to the front of the apparatus 10. The output of gearbox 90 may be coupled to one of the front legs 80 such that the gearbox 90 is configured to drive the front legs 80 to pivot relative to the seat portion 50. In the illustrated embodiment, the front leg 80 coupled to the gearbox 90 is supported by the gearbox 90, and the other front leg 80 is pivotably coupled to the side member 54 nearest to the front leg motor 82 (e.g., by including a bearing in the side member 54 and a stud protruding from the front leg 80 into the bearing). This configuration structurally connects the front legs 80 to the seat assembly 20 while still allowing relative movement between them. In some embodiments, the gearbox 90 prevents movement of the front legs 80 relative to the seat assembly 20 (e.g., by using a gearbox that requires a large amount of force to be back-driven like a worm gear drive or a cycloidal drive) unless the motor 82 is driven. In other embodiments, the front legs 80 can be selectively moveable (e.g., by using a clutch to decouple the front legs 80 from the gearbox 90). In other embodiments, the motor and gearbox are omitted entirely, and the front legs 80 can be selectively moveable manually (e.g., by manually turning a crank, by using a brake, etc.). In yet other embodiments, the front legs 80 are fixed relative to the seat portion 50.

Referring to FIG. 9, the patient transfer apparatus 10 may include the foot rest 100. In FIG. 9, the foot rest 100 is in an extended position. The foot rest 100 supports the legs and/or feet of the patient while they are seated on the patient transfer apparatus 10. This may be more comfortable for the patient, may allow the patient to be more securely seated in the apparatus 10 (e.g., by securing the patient's feet to the foot rest 100), and may prevent the patient from coming into contact with the set of stairs. As shown, the foot rest 100 is separate from (i.e., not fixed to) the front leg 80 and pivots about the same axis as the front legs 80. In other embodiments, the foot rest 100 is coupled to or integral with the front leg 80 such that the foot rest 100 and front leg 80 pivot together in unison. In yet other embodiments, foot rest 100 is omitted entirely. In the illustrated embodiment, the foot rest 100 includes two side foot rest members 102, a bottom foot rest member 106, and a patient interface 108. As shown, the side foot rest members 102 are rigidly coupled to bottom foot rest member 106 and the patient interface 108 to create one rigid structure. As shown, the patient interface 108 is a bent sheet of material that contacts the rear side of the patient's legs. In other embodiments, the patient interface 108 is otherwise constructed (e.g., is a flat sheet of material that contacts the bottom side of the patient's feet, is a contoured shape that goes around the patient's legs. Movement of the foot rest 100 can be controlled or actuated in a variety of ways (e.g., by a motor, with spring assistance, by the operator, by the front legs 80, via gravity, etc.). In some embodiments, the foot rest 100 includes a means for selectively locking its position relative to the seat portion 50 (e.g., a brake, a pin, a ratcheting mechanism, a latch that locks on to part of the foot rest 100 in a certain position, etc.).

Referring back to the exemplary embodiment shown in FIG. 3, the seat assembly 20 includes the seat back motor 42 which pivots the back portion 60 relative to the seat portion 50. Pivoting the back portion 60 allows the operator to adjust the orientation of the patient. In the illustrated embodiment, the seat back motor 42 is coupled to a gearbox 44 and provides power to the gearbox 44. In some embodiments, the gearbox 44 prevents movement of the back portion 60 relative to the seat portion 50 (e.g., by using a gearbox that requires a large amount of force to be back-driven like a worm gear drive or a cycloidal drive) unless the seat back motor 42 is driven. In other embodiments, the back portion 60 can be selectively moveable (e.g., by using a clutch to decouple the back portion 60 from the output of the gearbox 44). In other embodiments, the motor and gearbox are omitted entirely, and the seat back can be selectively moveable manually (e.g., by manually turning a crank, by using a brake, etc.). In yet other embodiments, the back portion 60 is fixed relative to the seat portion 50.

In some embodiments, the apparatus 10 includes one or more motors that perform more than one function. By way of example, one motor may be used to move the back portion 60, the front legs 80, and the rear legs 120. By way of another example, one motor is used to drive the tracks 122 and rear legs 120. In some embodiments, this is accomplished using one or more clutches to selectively decouple the motor from certain functions. By way of example, a clutch allows the operator to selectively decouple a motor from driving the track 122 while the motor continues to drive the rear legs 120. By way of another example, a torque limiting clutch decouples the motor from driving the rear legs 120 once the torque required to drive the rear legs 120 exceeds a certain threshold. In some embodiments, the apparatus 10 includes hard stops that prevent the movement of the parts of the apparatus 10 beyond a certain point. By way of example, the hard stops may be extensions of the frame 21 that interfere with movement of the rear legs 120.

Figure 10:
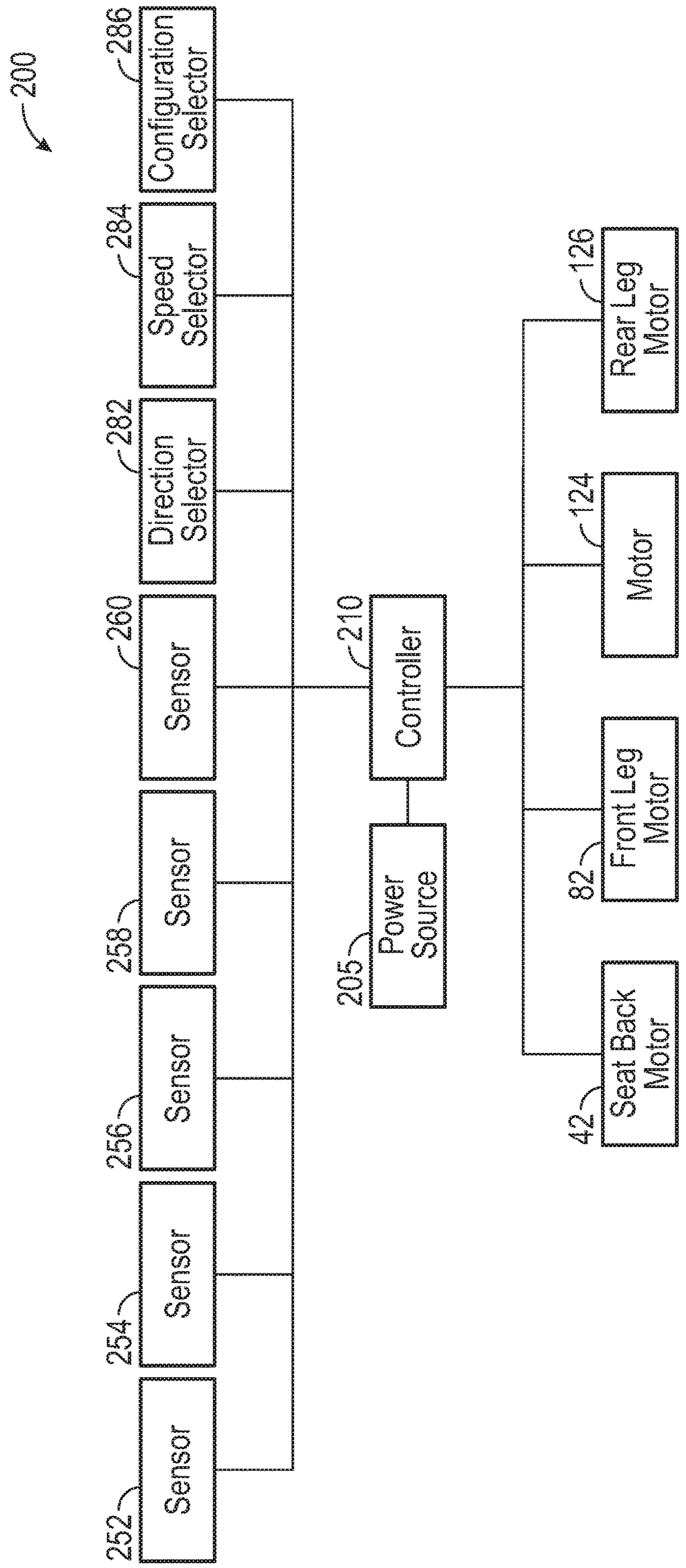
FIG. 10 is a schematic view of a control system of the patient transfer apparatus of FIG. 1, according to an exemplary embodiment.

An exemplary embodiment of a control system for the patient transfer apparatus is depicted in FIG. 10. In the illustrated embodiment, the control system 200 includes the sensors 252, 254, and 256. Sensor 252, shown in FIG. 3, is configured to sense an angular position (i.e., an angle) of the back portion 60 relative to the seat portion 50. Sensor 254, shown in FIG. 9, is configured to sense an angular position (e.g., an angle) of the front legs 80 relative to the seat assembly 20. Sensor 256, shown in FIG. 5, is configured to sense an angular position (e.g., an angle) of the rear legs relative to the seat assembly 20. In some embodiments, sensors 252, 254, and 256 are potentiometers. Sensors 252, 254, and 256 are operatively coupled to the controller 210 such that each sensor sends a signal to the controller 210 indicating its respective angular position. In some embodiments, one or more of the sensors 252, 254, and 256 are omitted.

In the illustrated embodiment, the control system 200 includes a sensor 258 configured to sense the angular offset of the seat portion 50 from level (i.e., perpendicular to the direction of gravity). In FIG. 1, the sensor 258 is rigidly coupled to the seat portion 50. Because the patient sits on the seat portion 50, this angular offset provides a direct indication of the orientation of the patient. In some embodiments, the sensor 258 is an accelerometer or inclinometer. Sensor 258 is operatively coupled to the controller 210. In other embodiments, the sensor 258 may be coupled to other portions of the seat assembly 20.

Figure 8:
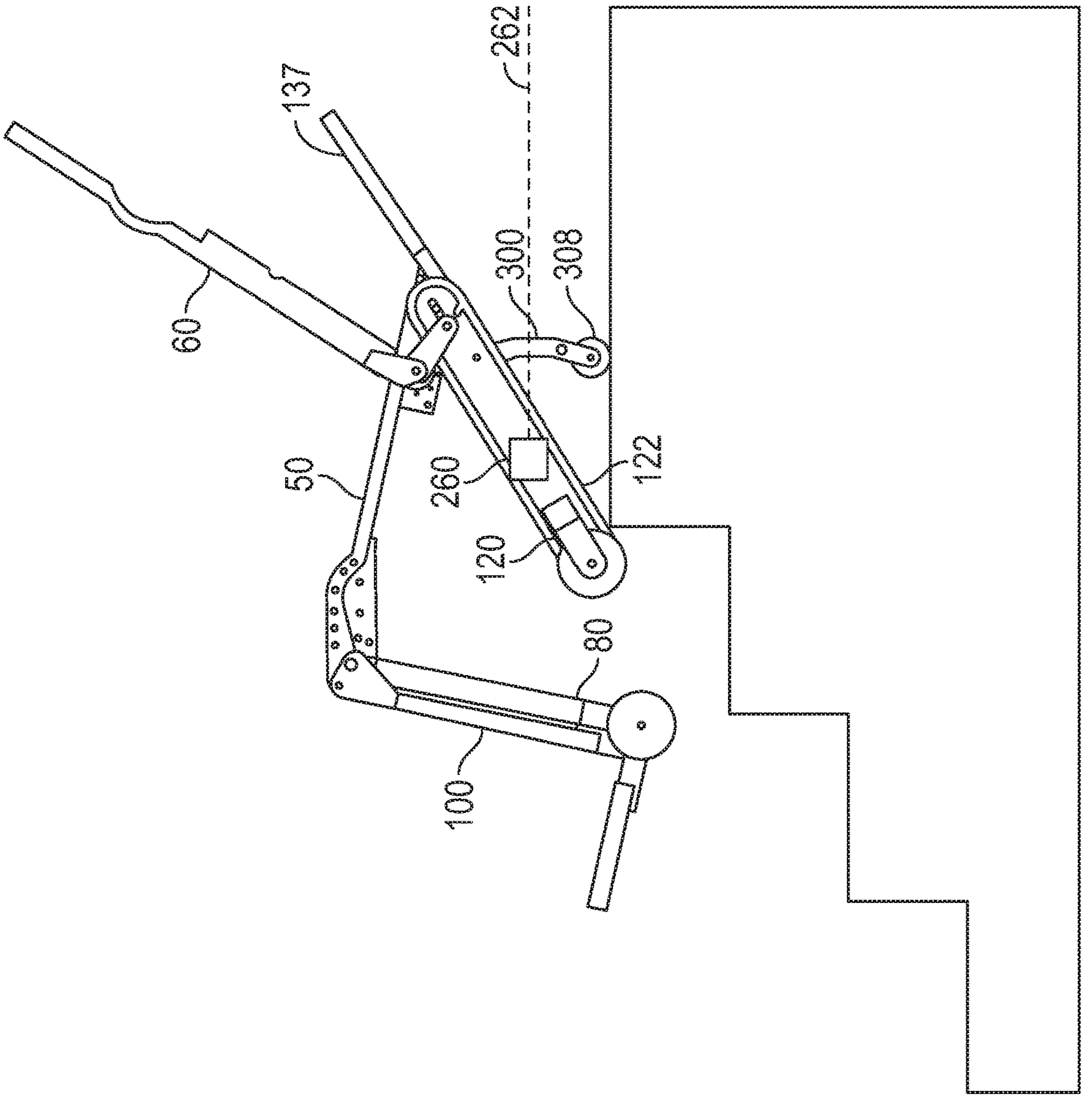
FIG. 8 is a side view of a patient transfer apparatus of FIG. 1 on a set of stairs.

In the illustrated embodiment, the control system 200 includes a sensor 260 configured to detect the proximity of an outside surface or object to the point of the apparatus 10 at which the sensor 260 is mounted. The sensor 260 is shown in FIG. 6 as being coupled to one of the rear legs 120, but in other embodiments the sensor 260 is located elsewhere depending on the point of interest. In some embodiments, the sensor 260 is a type of sensor that can measure distance (e.g., an ultrasonic sensor, a photoelectric sensor, a camera, etc.), however the sensor is configured to send a signal indicative of the proximity when the sensor 260 detects that the surface or object is within a certain distance of the sensor 260 (e.g., within 15 centimeters, within 30 centimeters, within 3 centimeters, etc.). In other embodiments, the sensor 260 uses a type of sensor that can only detect very close proximity (e.g., a limit switch). In yet other embodiments, the sensor 260 detects if an object or surface is within a line of sight 262 of the sensor 260. As shown in FIG. 6, the stairs break the line of sight 262 until the rear leg 120 reaches a landing at the top of the set of stairs, as shown in FIG. 8. The sensor 260 can therefore indicate when the part of the apparatus 10 holding the sensor passes a certain point on the set of stairs. In some embodiments, the sensor 260 is coupled to the rear leg 120 using a gimbaled mounting system in order to constantly point in the same direction regardless of the orientation of the rear legs 120.

The control system 200, shown according to an exemplary embodiment in FIG. 10, includes the power source 205, the controller 210, the sensors 252, 254, 256, 258, and 260, direction selector 282, speed selector 284, and configuration selector 286. Direction selector 282, speed selector 284, and configuration selector 286 may be configured to receive user input, using the user interface 280 shown in FIG. 11. The controller 210 can include a processor and a memory device. The processor can be implemented as a general purpose processor, an application specific integrated circuit (ASIC), one or more field programmable gate arrays (FPGAs), a group of processing components, or other suitable electronic processing components. The memory device (e.g., memory, memory unit, storage device, etc.) may be one or more devices (e.g., RAM, ROM, flash memory, hard disk storage, etc.) for storing data and/or computer code for completing or facilitating the various processes, layers and modules described in the present application. The memory device may include volatile memory or non-volatile memory. The memory device may include database components, object code components, script components, or any other type of information structure for supporting the various activities and information structures described in the present application. According to an exemplary embodiment, the memory device is communicably connected to processor via processing circuit and includes computer code for executing (e.g., by processing circuit and/or processor) one or more processes described herein. In some embodiments, the controller 210 includes both hardware and software. In other embodiments, the controller 210 is entirely hardware based.

As shown in the illustrated embodiment of FIG. 10, the power source 205 is operably coupled to all of the motors 42, 82, 124, and 126 and to the support member motor, the controller 210, the sensors 252, 254, 256, 258, and 260, and the operator interface 280 such that the power source 205 provides power at the levels necessary to operate (e.g., the correct voltage and current). In some embodiments, the power source 205 is operably coupled to the controller 210, and the controller 210 distributes power to the sensors and/or motors. In some embodiments, the power source 205 is a rechargeable electric battery. In some embodiments, there are multiple power sources 205 (e.g., one power source for each motor). In some embodiments, the power source is removable such that it can be recharged off of the patient transfer apparatus 10 or replaced.

In the illustrated embodiment, when using the motors 42, 82, and 126 to position the back portion 60, the front legs 80, and the rear legs 120, sensors 252, 254, and 256 are used. In some embodiments, the outputs of the sensors 252, 254, and 256 correspond to angular positions of the back portion 60, the front legs 80, and the rear legs 120. Using this feedback, the controller 210 can send commands to motors 42, 82, and 126 to move the back portion 60, the front legs 80, and the rear legs 120 to the desired positions. Various known closed-loop control methods can be used to accomplish this. In some embodiments, other sensors such as limit switches are used to find the absolute positions of the back portion 60, the front legs 80, the rear legs 120, and the support member 300.

Figure 11:
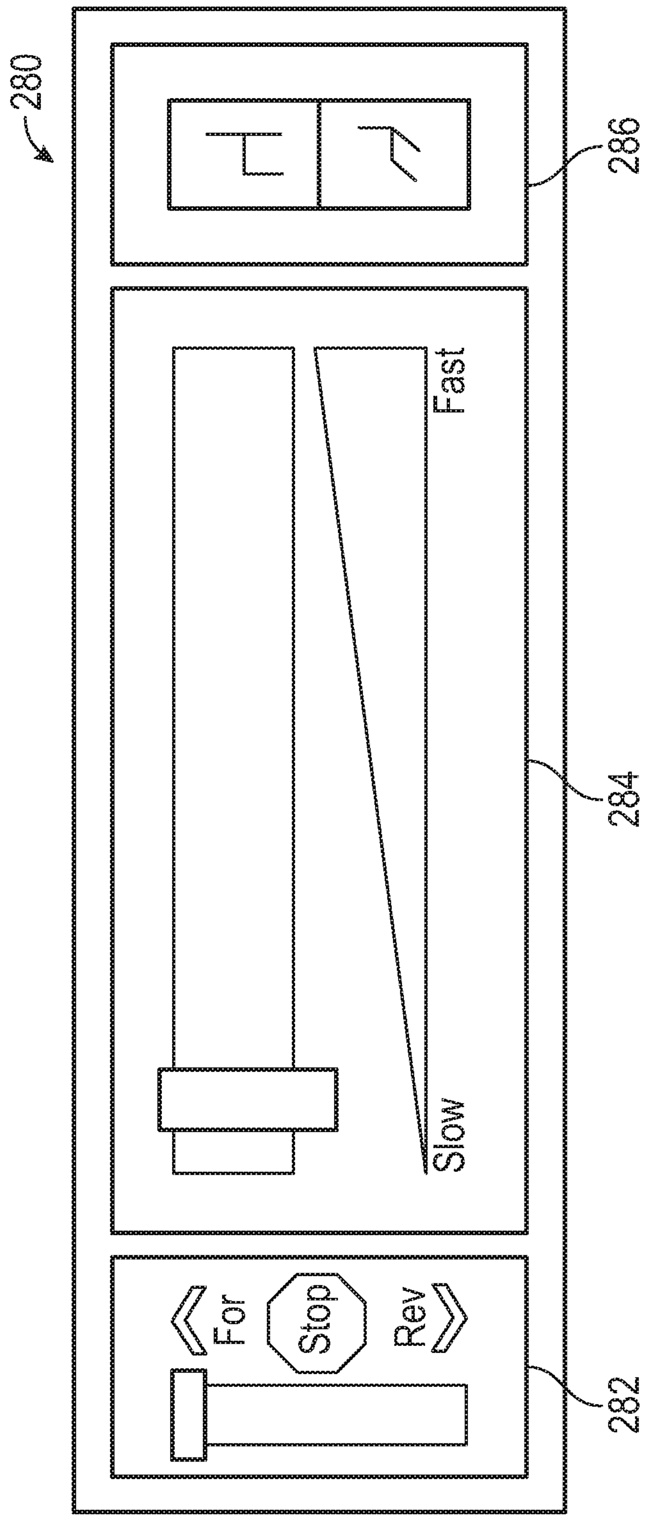
FIG. 11 is a schematic view of a user interface of the control system of FIG. 10, according to an exemplary embodiment.

An exemplary embodiment of an operator interface for the patient transfer apparatus is shown in FIG. 11. The operator interface 280 acts as a means for the operator to issue commands to the controller 210. In the embodiment shown, the operator interface 280 includes a direction selector 282, a speed selector 284, and a configuration selector 286. In one embodiment, the direction selector 282 allows the operator to select between driving the track 122 forwards and backwards and stopping the track 122. In some embodiments, the direction selector 282 is a three-position switch. The speed selector 284 allows the operator to select a desired speed at which to drive the track 122 and may include the capabilities of the direction selector 282. In some embodiments, the speed selector is a sliding potentiometer. In some embodiments, the configuration selector 286 allows the operator to select if the front legs 80 and/or the rear legs 120 should be in a transport position or a stair traversing position. In some embodiments, the configuration selector 286 is a switch. In other embodiments, the configuration selector 286 is a different type of interface (e.g., a button, multiple buttons, etc.). In some embodiments, one or more of the direction selector 282, the speed selector 284, and the configuration selector 286 are omitted from the operator interface 280. In some embodiments, the operator interface 280 is located at the handle 70.

According to one exemplary embodiment, when moving the patient transfer apparatus 10 on level ground, the patient transfer apparatus 10 is in a transport configuration, shown in FIG. 1. In the illustrated embodiment, in the transport configuration, the front legs 80 and the rear legs 120 are in the transport position where the wheels 86 and the wheels 140 contact the support surface (i.e., the floor). In some embodiments, the wheels 86 and the wheels 140 allow the operator to manipulate (e.g., push, pull, steer, etc.) the apparatus 10 by applying force to the handle 70. In this configuration, the back portion 60 and the foot rest 100 may also be moved to a transport position in order to maximize the comfort and security of the patient.

According to one exemplary embodiment, when approaching a set of stairs, the patient transfer apparatus 10 assumes a stair traversing configuration, shown in FIG. 6. In this configuration, each of the front legs 80 and the rear legs 120 pivot towards a stair traversing position. In some embodiments, the stair traversing position of the front legs 80 is the same as the transport position. In some embodiments, the back portion 60 and the foot rest 100 move relative to the seat portion 50 to a stair traversing position (e.g., the foot rest 100 is raised when traversing the stairs to prevent the feet of the patient from contacting the stairs). In some embodiments, the controller 210 reconfigures the patient transfer apparatus 10 from the transport configuration to the stair traversing configuration when triggered by the operator interacting with the configuration selector 286. In other embodiments, this reconfiguration is automatic and can be triggered by one of the sensors 260 detecting the presence of the set of stairs (e.g., a limit switch on the rear leg 120 contacts the set of stairs). In some embodiments, both the configuration selector 286 and the sensor 260 are used to trigger this reconfiguration. In the illustrated embodiment, in the stair traversing position, the rear legs 120 are oriented so that the track 122 contacts the set of stairs (i.e., the support surface) as shown in FIG. 7. This allows the track 122 to act as a tractive element between the stairs and the patient transfer apparatus 10 and move the patient transfer apparatus 10 up or down the set of stairs. Because the track 122 contacts the stairs, when traversing the stairs, the angle of the rear legs 120 relative to the set of stairs is fixed. Because the patient sits above the tracks 122 in the stair traversing configuration, the center of gravity of the patient is located in a stable position inside the length of the track 122 and between the two tracks 122, which prevents tipping.

In some embodiments, when transitioning from the transport configuration on a landing at the bottom of the set of stairs to the stair traversing configuration on the stairs, rear leg 120 moves to an angle relative to the set of stairs where it is capable of contacting more than one stair (i.e., the stair traversing position). In some embodiments, this is done without moving the front legs 80 relative to the seat portion 50 (e.g., because the front legs 80 are fixed relative to the seat portion 50), and the movement of the rear leg 120 causes the rear end of the seat portion 50 to move relative to the ground and the seat portion 50 to tilt accordingly. In other embodiments, both the front legs 80 and the rear legs 120 move (in some cases simultaneously), lowering the seat portion 50 and patient without tilting the seat portion 50. In some embodiments, the back portion 60 and the foot rest 100 move to respective stair traversing positions as well. In some embodiments, in the stair traversing configuration the apparatus 10 requires additional support to stay upright on level ground due to shifting of the center of gravity of the apparatus 10. In some embodiments, the support member 300 moves to the deployed position to allow the apparatus 10 to be supported while on the landing and moves back to the stored position when the apparatus 10 moves over the stairs (e.g., by the support member 300 being pushed by the stairs toward the stored position). In other embodiments, the apparatus 10 is positioned close to the set of stairs when changing configurations such that the rear legs 120 contact the stairs during the transition, ensuring that the apparatus 10 is supported by the stairs once the apparatus 10 reaches the stair traversing configuration. Once the tracks 122 are in contact with the stairs, the apparatus 10 can move up the set of stairs. In some embodiments, the operator pulls or pushes the apparatus 10 up the set of stairs, and the tracks 122 and the slides 137 only serve as a guide to assist the apparatus 10 in moving between stairs smoothly. In other embodiments, the operator uses the direction selector 282 and the speed selector 284 to indicate to the controller 210 the desired speed and direction of movement, and the controller 210 controls motors 124 to drive the tracks 122 at the desired speed, moving the apparatus 10 up the set of stairs. Once the apparatus 10 reaches the landing at the top of the set of stairs, the apparatus 10 can return to the transport configuration.

The seat portion 50 may be oriented such that the patient maintains a certain desired orientation while traversing (i.e., ascending or descending) the set of stairs. In some embodiments, this orientation is similar to the orientation when in the transport configuration. In other embodiments, the orientation changes to tip the patient back slightly (e.g., 2 degrees from level, 5 degrees from level, etc.) so gravity holds the patient on the patient transfer apparatus 10. Depending on how steep the set of stairs is, the angle between the seat portion 50 and the rear legs 120 required to achieve this desired orientation may change. In some embodiments, the seat portion 50 is self-leveling using the controller 210 to maintain the desired orientation of the seat portion 50. In some embodiments, a nominal target value for the angle between the seat portion 50 and the rear legs 120 is predetermined to achieve the desired orientation for an average set of stairs, and the controller 210 uses feedback from sensor 256 to determine how to control the motor 126 to achieve the target angle. In other embodiments, feedback from the sensor 258 is used by the controller 210 to determine the actual orientation of the seat portion 50 relative to the direction of gravity, and the controller 210 controls motor 126 to adjust an angular position of the seat portion relative to the rear leg to achieve a desired orientation. Adjusting the position of the seat portion 50 in this way ensures that the patient will experience the same target orientation regardless of the steepness of the stairs being traversed. In some embodiments, the controller 210 continuously monitors the actual orientation of the seat portion 50 and controls motor 126 to bring the seat portion 50 to the desired orientation. In some embodiments, the operator can manually adjust the angle between the seat portion 50 and the rear legs 120. In some embodiments, the operator manually controls the motor 126. In other embodiments, the operator can move the rear legs 120 using a mechanical means (e.g., a brake, a crank, etc.). Adjusting the apparatus such that the seat portion 50 moves to or maintains the predetermined orientation is also described in U.S. patent application Ser. No. 15/855,161, entitled PATIENT TRANSFER APPARATUS, filed concurrently herewith on Dec. 27, 2017, which is hereby incorporated by reference in its entirety.

In some embodiments, while traversing the set of stairs, a control mechanism (e.g., the controller 210) monitors a sensor that indicates if a patient is present on the patient transfer apparatus 10. This may be determined by measuring the load on the seat 52, the temperature of the occupant, or by other means. In some embodiments, the controller 210 further differentiates between an object placed on the seat 52 and a patient. The controller 210 may control the speed of the track based on the presence or absence of the patient. By way of example, if the controller 210 determines that a patient is present on the patient transfer apparatus 10, the controller 210 runs the tracks 122 more slowly to ensure the safety of the patient. If the controller 210 does not detect the presence of a patient, then the controller 210 runs the tracks 122 more quickly to get to the destination in a shorter period of time.

In some embodiments, once the apparatus 10 is near the top of the set of stairs, the sensor 260 detects that the top of the set of stairs (i.e., the landing) is near (e.g., the line of sight of sensor 260 is not broken by a stair) and sends a signal to the controller 210 indicating this. Once the controller 210 receives this signal, the controller 210 controls movement of the support member 300 from the stored position to the deployed position (e.g., using a motor, by releasing a latch mechanism, etc.). In other embodiments, the operator moves the support member 300 to the deployed position (e.g., by releasing a latch mechanism and allowing the biasing force to move the support member 300). The apparatus 10 may then climb the top step and be supported by support member 300 as shown in FIGS. 7 and 8. In other embodiments, the support member 300 is omitted, and at least a portion of the weight of the apparatus 10 and of the patient is supported by the operator when climbing the top step. The operator may then pull or push the apparatus 10 so it is fully supported by the landing at the top of the set of stairs. The apparatus 10 can then return to the transport configuration, either by the operator interacting with the configuration selector 286, which sends a signal to the controller 210 as a request for the controller 210 to command movement of the back portion 60, front legs 80, rear legs 120, and foot rest 100 to their respective transport positions, or by the operator manually moving the parts of the apparatus 10, or some combination thereof. The support member 300 may also be moved back into the stored position.

In some embodiments, when transitioning from the transport configuration on the landing at the top of the set of stairs to the stair traversing configuration on the stairs, the rear leg 120 moves to an angle relative to the set of stairs such that the track 122 contacts more than one stair when engaging the stairs (e.g., the stair traversing position). In some embodiments, this is done without moving the front legs 80 relative to the seat portion 50 (e.g., because the front legs 80 are fixed relative to the seat portion 50), and the movement of the rear leg 120 causes the rear end of the seat portion 50 to move lower relative to the ground and the seat portion 50 to tilt to prevent the front legs 80 from contacting the stairs. In other embodiments, both the front legs 80 and the rear legs 120 move (in some cases simultaneously), lowering the seat portion 50 and patient without tilting the seat portion 50. In some embodiments, the back portion 60 and the foot rest 100 move to respective stair traversing positions as well. In some embodiments, while on the landing, the support member 300 is in the deployed position to support the apparatus 10. In other embodiments, the operator supports the apparatus 10 on the landing (without use of the support member 300). Once in the stair traversing configuration, the operator can push or pull the apparatus so the tracks 122 contact the stairs, and the support member 300 can be moved back to the stored position. In some embodiments, the operator then pulls or pushes the apparatus 10 down the set of stairs, and a damping force on the tracks 122 controls the movement of the apparatus 10. In other embodiments, the operator uses the direction selector 282 and the speed selector 284 to indicate to the controller 210 the desired speed and direction of movement, and the controller 210 operates motors 124 to drive the tracks 122 accordingly, moving the apparatus 10 down the set of stairs at a controlled speed. Once the apparatus 10 reaches the landing at the bottom of the set of stairs, the apparatus 10 can be returned to the transport configuration.

In some embodiments, one or more of the rear legs 120, the front legs 80, the seat portion 50, and/or the back portion 60 of the seat assembly 20 move together (e.g., the front legs 80 and the rear legs 120 move at the same rate and in the same direction upon moving to the stair traversing configuration, or the front legs 80 move at 10% of the rate of the rear legs 120 and in the opposite direction, etc.). In some embodiments, this is accomplished using a mechanical means (e.g., front legs 80 and rear legs 120 are both coupled to a link creating a four-bar linkage, the front legs 80 and the rear legs 120 are coupled by a series of gears, the rear legs 120 and the back portion 60 are driven by the same gearbox, etc.). In other embodiments, this is accomplished using a control system, such as the control system 200 (e.g., the controller 210 uses sensors 254 and 256 to determine the angular positions of front legs 80 and the rear legs 120 and operates the motors 82 and 126 to move at a calculated rate(s)). This may be advantageous because it simplifies the process of changing the patient transfer apparatus 10 from the stair traversing configuration to the transport configuration. This process reduces the number of steps (e.g., move the front legs 80, then move the rear legs 120) to a single step (e.g., move both the front legs 80 and the rear legs 120 simultaneously), potentially saving the operator time and simplifying the use of the apparatus 10. This may also be advantageous because it reduces the number of motors necessary in the apparatus 10.

In some embodiments, the controller 210 may be configured to automatically command movement of at least one of the support member 300, front legs, rear legs, seat portion, and back portion based on environmental feedback or input, such as (for example and without limitation) operator input, transition to or from the stairs, accidental impact to the apparatus, and/or other environmental factors indicative of apparatus imbalance. In some embodiments, such commanded movement by the controller 210 does not include movement of the support member 300 and only includes movement of at least one of the other elements of the apparatus 10 (based on the environmental feedback or input). In some embodiments, the apparatus 10 does not include support member 300. Imbalance of the apparatus may be determined or inferred based on shifting of the center of gravity or center of mass, detection of slip, load distribution on the seat portion, conditions of the stairs (slope, material, or wetness of the stairs), atmospheric conditions (e.g., wind or precipitation), other situational factors, etc. In some embodiments, the controller 210 is configured to, in response to at least one of (i) an input indicative of a desire to move from one of the transport and stair traversing positions to the other of the transport and stair traversing positions, and (ii) a center of gravity of the apparatus moving outside a desired area, move at least one of the front legs, rear legs, seat portion, back portion, and support member to balance the unit. In some embodiments, the controller is configured to, in response to at least one of (i) an input indicative of a desire to move from one of the transport and stair traversing positions to the other of the transport and stair traversing positions, and (ii) a center of gravity of the apparatus moving outside a desired area, move at least one of the front legs, rear legs, back portion, and support member relative to the seat portion to move or maintain the center of gravity within the desired area. The center of gravity is calculated based on the occupancy of the apparatus (e.g., including the patient). Center of gravity may be calculated using feedback from the sensors of the apparatus.

Figure 12:
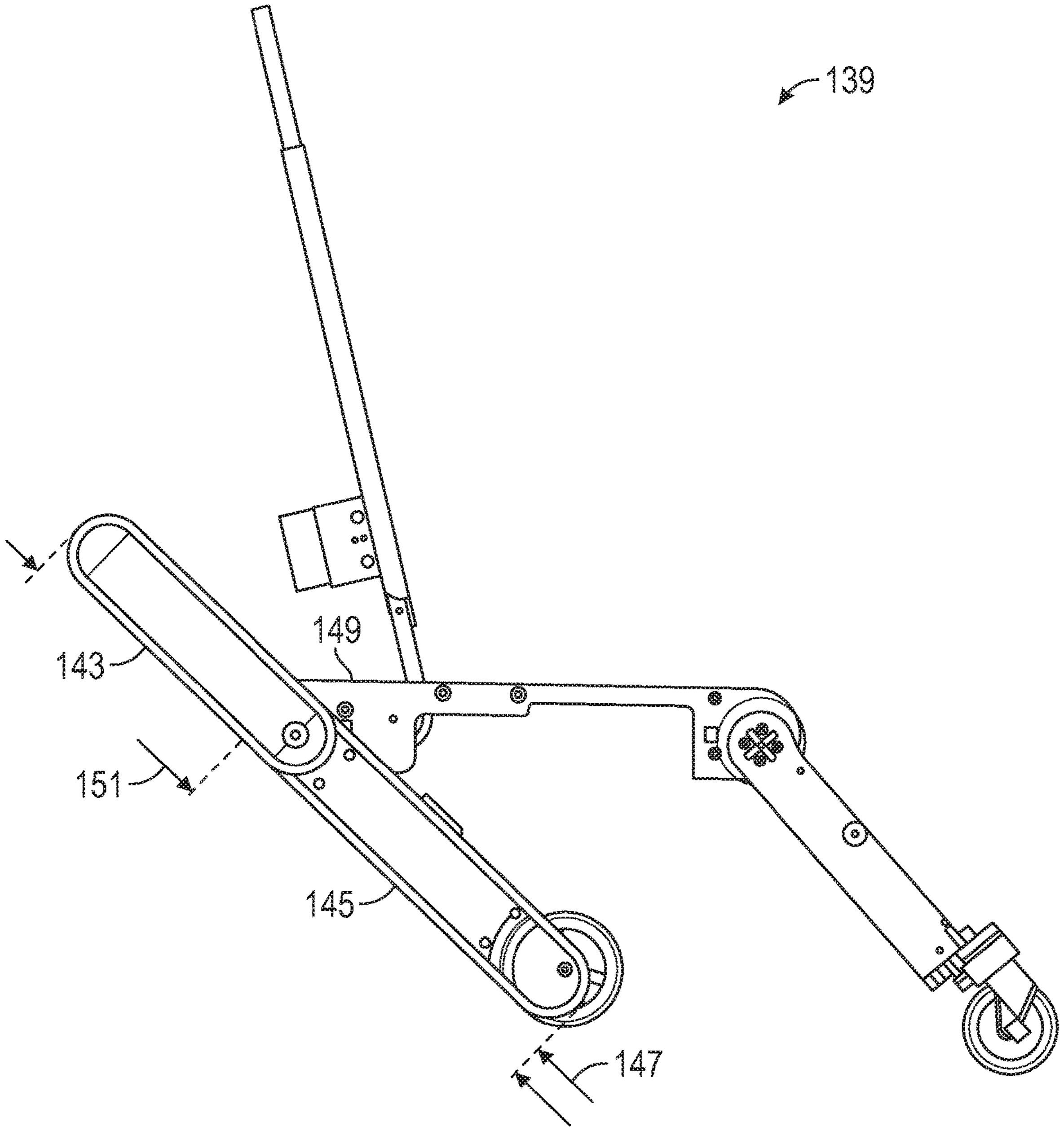
FIG. 12 is a side view of a patient transfer apparatus, according to an exemplary embodiment.
Figure 13:
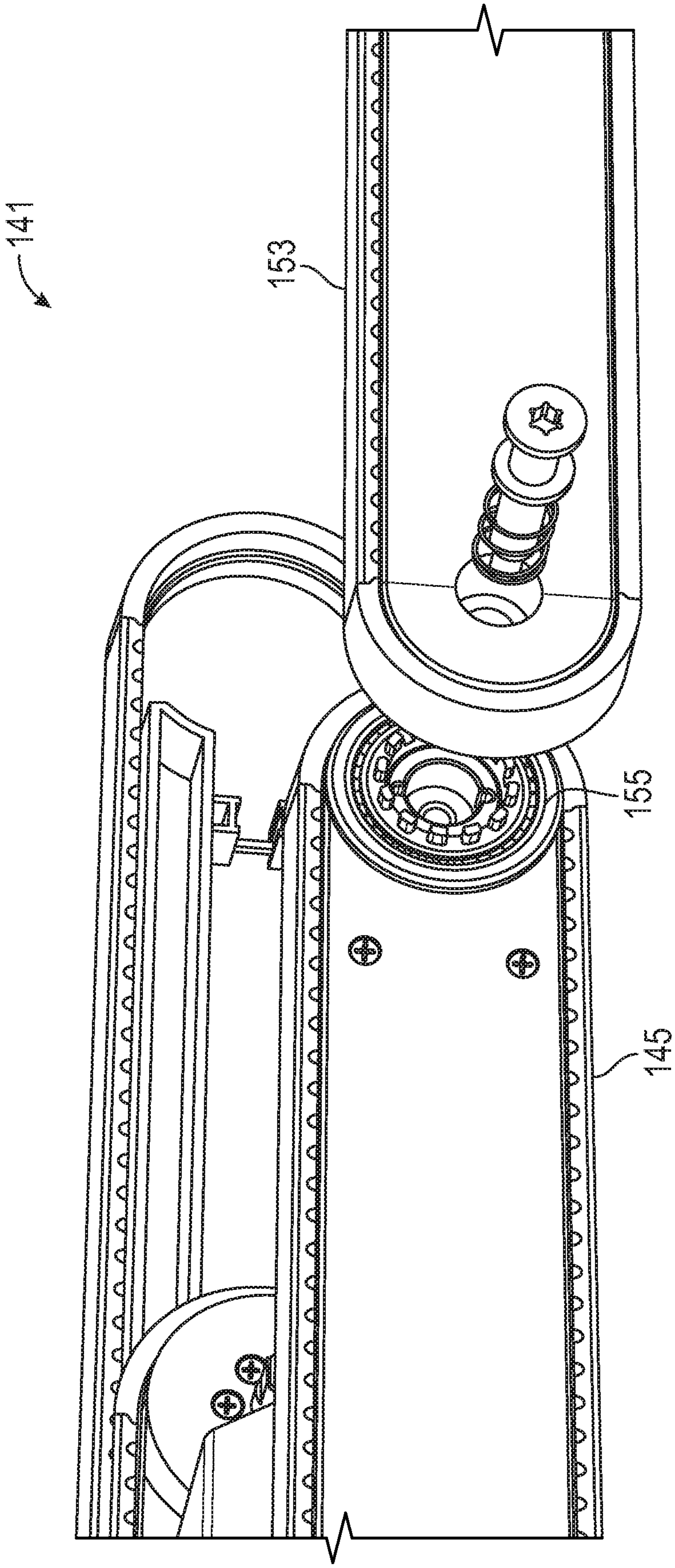
FIG. 13-14 are exploded schematic views of a portion of a rear leg assembly of the patient apparatus of FIG. 12.
Figure 14:
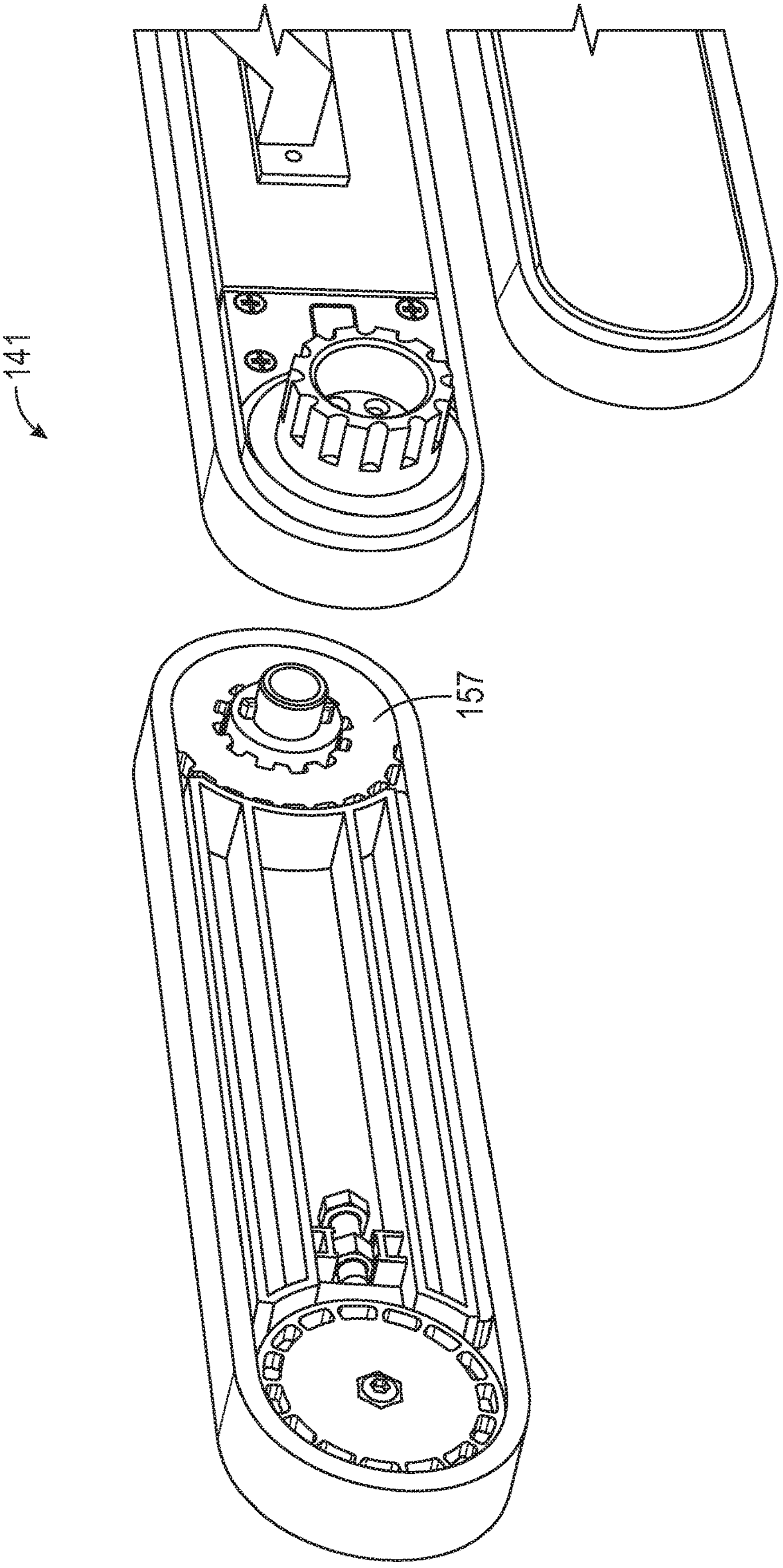

FIG. 12 is a side view of a patient transfer apparatus 139, according to an exemplary embodiment. FIGS. 13-14 are exploded schematic views of a portion of a rear leg assembly 141 of the patient transfer apparatus 139 of FIG. 12. In some embodiments, the patient transfer apparatus 139 of FIGS. 12-14 is similar to the patient apparatus 10 described herein, and the rear leg assembly 141 is similar to the rear leg 120 of patient transfer apparatus 10 described herein. In the illustrated embodiment of FIGS. 12-14, each of the rear leg assemblies 141 includes an extension member 143 configured to engage the stairs in the stair traversing position. In some embodiments, the extension member 143 is the slide 137 discussed herein. In the illustrated embodiment of FIGS. 12-14, the extension member 143 includes a track assembly similar to the track assemblies discussed here. The extension member 143 may extend from the track 145 of the rear leg assembly 143 in at least one of the transport and stair traversing positions to increase an overall length 147 of the rear leg assembly 141. In some embodiments, the extension member 143 and track 145 are moveable relative to the frame 149 independently of one another. Upon moving from the transport position to the stair traversing position, the extension member 143 and track 145 may unfold to form the increased overall length (from length 151 to length 147). In the illustrated embodiment, the extension member 143 includes a track 153 configured to move relative to the frame 149 to engage the stairs in the stair traversing position. In some embodiments, the motor of the apparatus 139 is configured to drive both tracks 145, 153. In other embodiments, the tracks 145, 153 are driven by separate motors. In the illustrated embodiment, the elements of the extension member 143 and track 145 are keyed to one another such that rotation of one pulley 155 affects rotation of the other pulley 157. The pulleys 155, 157 may be coaxial with one another.

The construction and arrangement of the apparatus, systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, some elements shown as integrally formed may be constructed from multiple parts or elements, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

What is claimed is:

1. A patient support apparatus configured to traverse stairs, comprising:
- a frame including a seat portion;
- a front leg coupled to the frame adjacent to a front side of the patient support apparatus; and
- a rear leg assembly spaced from the front leg, a proximal end of the rear leg assembly coupled to the frame adjacent to a rear side of the patient support apparatus and a distal end of the rear leg assembly pivotable relative to the seat portion between a transport position and a stair traversing position, the rear leg assembly being configured to support the patient support apparatus in the transport and stair traversing positions, the rear leg assembly including:
  - a track configured to move relative to the frame to engage the stairs in the stair traversing position, and
  - an extension member disposed at the proximal end of the rear leg assembly and configured to engage the stairs in the stair traversing position, the extension member extending from the track in the stair traversing position to increase an overall length of the rear leg assembly.

2. The patient support apparatus of claim 1, wherein the track and the extension member of the rear leg assembly are pivotable relative to the seat portion in unison between the transport and stair traversing positions.

3. The patient support apparatus of claim 1, wherein the rear leg assembly further includes a vertical rear leg member coupled to the track.

4. The patient support apparatus of claim 3, wherein the rear leg assembly further includes at least one pulley rotatably coupled to the vertical rear leg member for supporting movement of the track relative to the frame.

5. The patient support apparatus of claim 1, wherein the extension member is laterally offset from the track.

6. The patient support apparatus of claim 1, wherein the extension member extends from the track in the transport position to increase an overall length of the rear leg assembly.

7. The patient support apparatus of claim 1, wherein the extension member and track are moveable relative to the frame independently of one another.

8. The patient support apparatus of claim 1, wherein upon moving from the transport position to the stair traversing position, the extension member and track unfold to form the increased overall length.

9. The patient support apparatus of claim 1, wherein the track is a first track, and the extension member includes a second track configured to move relative to the frame to engage the stairs in the stair traversing position.

10. The patient support apparatus of claim 9, further comprising a motor configured to drive the first and second tracks.

11. The patient support apparatus of claim 9, wherein the second track is laterally offset from the first track.

12. The patient support apparatus of claim 1, further comprising a rear leg motor coupled to the rear leg assembly to drive pivoting of the rear leg assembly relative to the seat portion.

13. The patient support apparatus of claim 12, further comprising a controller configured to control the rear leg motor to adjust an angular position of the seat portion relative to the rear leg assembly to achieve a desired orientation.

14. The patient support apparatus of claim 1, wherein the seat portion is self-leveling.

15. The patient support apparatus of claim 1, wherein the front leg is pivotably coupled to the frame such that the front leg is pivotable relative to the frame.

16. The patient support apparatus of claim 15, further comprising a front leg motor coupled to the front leg to drive pivoting of the front leg relative to the seat portion.

17. The patient support apparatus of claim 1, further comprising a foot rest coupled to a front end portion of the frame.

* * * * *